(12) United States Patent
Shi et al.

(10) Patent No.: US 9,980,254 B2
(45) Date of Patent: May 22, 2018

(54) CONTROL CHANNEL TRANSMISSION METHOD, TRANSMISSION PROCESSING METHOD, COMMUNICATION NODE AND TERMINAL

(71) Applicant: ZTE CORPORATION, Shenzhen, Guangdong Province (CN)

(72) Inventors: Jing Shi, Shenzhen (CN); Bo Dai, Shenzhen (CN); Shuqiang Xia, Shenzhen (CN); Zhaohua Lu, Shenzhen (CN); Xincai Li, Shenzhen (CN)

(73) Assignee: ZTE Corporation (CN)

( * ) Notice: Subject to any disclaimer, the term of this patent is extended or adjusted under 35 U.S.C. 154(b) by 76 days.

(21) Appl. No.: 14/910,429

(22) PCT Filed: May 20, 2014

(86) PCT No.: PCT/CN2014/000513
§ 371 (c)(1),
(2) Date: Feb. 5, 2016

(87) PCT Pub. No.: WO2014/173185
PCT Pub. Date: Oct. 30, 2014

(65) Prior Publication Data
US 2016/0183231 A1 Jun. 23, 2016

(30) Foreign Application Priority Data
Aug. 8, 2013 (CN) .......................... 2013 1 0344327

(51) Int. Cl.
*H04W 72/04* (2009.01)
*H04L 1/08* (2006.01)
*H04L 5/00* (2006.01)
*H04W 4/00* (2018.01)

(52) U.S. Cl.
CPC .......... *H04W 72/0406* (2013.01); *H04L 1/08* (2013.01); *H04W 72/0446* (2013.01);
(Continued)

(58) Field of Classification Search
CPC ....... H04L 1/08; H04L 5/0007; H04L 5/0053; H04W 4/005; H04W 72/0406; H04W 72/0446
See application file for complete search history.

(56) References Cited

U.S. PATENT DOCUMENTS

| | | | |
|---|---|---|---|
| 2010/0008317 A1* | 1/2010 | Bhattad | H04L 1/0003 370/329 |
| 2011/0222491 A1 | 9/2011 | Vajapeyam et al. | |
| 2016/0165640 A1* | 6/2016 | Yang | H04W 4/005 370/336 |

FOREIGN PATENT DOCUMENTS

| | | |
|---|---|---|
| CN | 101848483 A | 9/2010 |
| CN | 102273307 A | 12/2011 |
| CN | 102550111 A | 7/2012 |

OTHER PUBLICATIONS

"Technical Specification Group Radio Access Network; "3GPP TR 36.888 V12.0.0: Study on provision of low-cost-Machine-Type Communications (MTC) User Equipments (UEs) based on LTE (Release 12)""Jun. 30, 2013, Section 9.1, 9.5.4 and 9.5.6.
(Continued)

*Primary Examiner* — Khaled Kassim
*Assistant Examiner* — Zhaohui Yang
(74) *Attorney, Agent, or Firm* — Plumsea Law Group, LLC

(57) ABSTRACT

The present document provides a method for transmitting control channels, method for processing transmission, communication node and terminal. The method for transmitting control channels includes: determining resources for transmitting the control channels according to predefined information and transmitting repeatedly the control channels
(Continued)

multiple times on the determined resources for transmitting the control channels, the predefined information including at least one of following information: the number of repetitions of the control channels, control channel type, traffic channel type and traffic channel starting position.

13 Claims, 6 Drawing Sheets

(52) U.S. Cl.
CPC .......... *H04L 5/0007* (2013.01); *H04L 5/0053* (2013.01); *H04W 4/005* (2013.01)

(56) References Cited

OTHER PUBLICATIONS

ZTE. "Diminishing returns and coverage improvement summary for TR36.888" 3GPP TSG RAN WG1 Meeting #73, Fukuoka, Japan, May 20-24, 2013, section 2. R1-132110.

Huawei et al, "Coverage analysis on (E)PDCCH and PUCCH for low-cost MTC UEs" 3GPP TSG RAN WG1 Meeting #72b, Chicago, USA, Apr. 15-19, 2013, section 2.1. R1-130889.

International Search Report and Written Opinion dated Sep. 1, 2014 in European Patent Application No. PCT/CN2014/000513.

European Search Report dated Sep. 14, 2016 in EP Application No. EP14787460.6.

MediaTek Inc. "Coverage Analysis of PDSCH and Enhancement Techniques for MTC UEs" 3GPP TSG-RAN WG1 #72bis, Chicago, USA, Apr. 14-Apr. 19, 2013, R1-131180.

Alcatel-Lucent, Alcatel-Lucent Shanghai Bell "(E)PDCCH coverage extension for MTC devices" 3GPP TSG-RAN WG1 Meeting #72bis, Chicago, USA, Apr. 15-19, 2013, R1-130941.

LG Electronics "PDSCH/PUSCH/(E)PDCCH and DMRS Enhancement for Coverage limiting UEs" 3GPP TSG RAN WG1 #72bis, Chicago, USA, Apr. 15-19, 2013, R1-131297.

MediaTek Inc. "On Required System Functionalities for MTC UEs Operating in Enhanced Coverage Mode" 3GPP TSG RAN WG1 Meeting #72, St. Julian's, Malta, Jan. 28-Feb. 1, 2013, R1-130218.

* cited by examiner

CONTROL CHANNEL TRANSMISSION METHOD, TRANSMISSION PROCESSING METHOD, COMMUNICATION NODE AND TERMINAL

CROSS-REFERENCE TO RELATED APPLICATION(S)

This application is the U.S. National Phase application of PCT application number PCT/CN2014/000513 having a PCT filing date of May 20, 2014, which claims priority of Chinese patent application 201310344327.6 filed on Aug. 8, 2013, the disclosures of which are hereby incorporated by reference.

TECHNICAL FIELD

The present document relates to Long-Term Evolution (LTE) systems/Long-Term Evolution Advance (LTE-Advance, LTE-A) systems, and more particularly, to a method for transmitting control channels, method for processing transmission, communication node and terminal.

BACKGROUND OF RELATED ART

Machine Type Communication (MTC) user terminal (referred to as user equipment or terminal), also called Machine to Machine (M2M) user communication device, is one of main application forms of the present Internet of Things. In recent years, due to high spectral efficiency of Long-Term Evolution (LTE) systems/Long-Term Evolution Advance (LTE-Advance, LTE-A) systems, more and more mobile operators choose LTE/LTE-A as an evolution direction of broadband wireless communication systems. Multiple LTE/LTE-A-based MTC data services will be more attractive.

Related LTE/LTE-A systems perform transmission based on dynamic scheduling of each subframe, i.e., each subframe can transmit a different control channel, a frame structure of which is shown in FIGS. 1 and 2.

FIG. 1 is a schematic diagram of a frame structure of a Frequency Division Duplexing (FDD) mode in accordance with the related art. As shown in FIG. 1, a radio frame of 10 ms consists of twenty slots numbered 0~19 with a length of 0.5 ms, slots $2i$ and $2i+1$ forming a subframe i with a length of 1 ms, wherein i is 0 or a nature number.

FIG. 2 is a schematic diagram of a frame structure of a Time Division Duplexing (TDD) mode in accordance with the related art. As shown in FIG. 2, a radio frame of 10 ms consists of two half frames with a length of 5 ms, a half frame including 5 subframes with a length of 1 ms and subframe i being defined as 2 slots $2i$ and $2i+1$ with a length of 0.5 ms.

The Physical Downlink Control Channel (PDCCH) and enhanced Physical Downlink Control Channel (ePDCCH) are defined in the LTE/LTE-A. Information carried by the Physical Control Format Indicator Channel (PCFICH) is used to indicate the number of Orthogonal Frequency Division Multiplexing (OFDM) symbols which transmit the PDCCH in a subframe. The Physical Hybrid-ARQ Indicator Channel (PHICH) is used to carry acknowledgement/negative acknowledgement (ACK/NACK) feedback information of uplink transmission data, wherein ARQ is an abbreviation of Automatic Repeat-reQuest.

The PDCCH used to carry Downlink Control Information (DCI) includes uplink and downlink scheduling information and uplink power control information.

Generally, a MTC terminal can obtain the DCI by demodulating the PDCCH/ePDCCH in each subframe in order to achieve demodulating of the Physical Downlink Share Channel (PDSCH) and scheduling indication information of the Physical Uplink Share Channel (PUSCH).

Among MTC application terminals, there is a kind of terminals, coverage performance of which decreases significantly due to their positions or the limitation of their own characteristics. For example, MTC terminals of an intelligent meter reading type mostly are installed fixedly under a low coverage performance environment, such as in a basement, mainly send small packet data, and therefore have a low demand for data rate and are able to tolerate greater data transmission delay. Because of such terminals' low demand for data rate, for data channels, correct transmission of the small packet data can be ensured by lower modulating code rate and multiple repeated transmissions in time domain; for synchronization channels, information sent by base stations is same, so it is enough for the terminals to receive the same information sent by multiple subframes. For control channels, the method of which multiple subframes sending the same DCI repeatedly is not supported at present.

SUMMARY

The technical problem to be solved by the present document is to provide a method for transmitting control channels, method for processing transmission, communication node and terminal able to implement repeated transmission of control channels.

In order to solve the above technical problem, the present document provides a method for transmitting control channels comprising:

a communication node determining resources for transmitting the control channels according to predefined information and transmitting repeatedly the control channels multiple times on the determined resources for transmitting the control channels, the predefined information including at least one of following information: the number of repetitions of the control channels, control channel type, traffic channel type and traffic channel starting position.

Preferably, the resources for transmitting the control channels are at least located in two or more than two subframes or in one subframe where the number of Orthogonal Frequency Division Multiplexing (OFDM) symbols occupied by the control channels is at least greater than 3.

Preferably, the number of repetitions of the control channels is determined by factors, including one or more of coverage level, preamble of random access, random access response message, conflict resolution message, aggregation level, control information DCI format, control information type, system information and physical broadcast channel (PBCH) information or further including the number of repetitions of the control channels fed back by a terminal corresponding to the communication node, the PBCH information including the number of repetitions of the PBCH and/or signaling carried by the PBCH, and the control information type including cell specific information and UE specific information.

Preferably, the determining resources for transmitting the control channels according to predefined information comprises:

the communication node configuring respectively a starting subframe of control channels scheduling new transmission service messages and a starting subframe of control channels scheduling retransmission service messages according to the control channel type.

Preferably, the determining resources for transmitting the control channels according to predefined information comprises:

the communication node configuring independently a starting subframe of control channels scheduling the cell specific information and a starting subframe of control channels scheduling the specific information according to the control channel type.

Preferably, the starting subframe of the control channels is configured using one of the following methods:

method 1: the starting subframe of the control channels is determined according to a relation (k+h*n)mod N=0, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, and N represents the number of repetitions of the control channels;

method 2: the starting subframe of the control channels is determined according to a relation (k+h*n)mod M=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, ... , (M/N−1)*N};

method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, ... , M/h}; and method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in a radio frame, N represents the number of repetitions of the control channels, and m is a subset of a set {0, 1, ... , N−1}.

Preferably, for the method 2, in Time Division Duplexing (TDD) systems, taking H half-frames as the period M, downlink control channel transmission is configured once within the period M, the number of subframes contained in the H half-frames being greater than or equal to N.

Preferably, the transmitting repeatedly the control channels multiple times on the determined resources for transmitting the control channels comprises using uplink and downlink configuration 1, uplink and downlink configuration 2, uplink and downlink configuration 4 or uplink and downlink configuration 6 to perform downlink repeated transmission of the control channels in TDD systems.

Preferably, the method further comprises the communication node, before transmitting the control channels, sending one or more of the number N of repetitions of the control channels, the period M and m to the terminal corresponding to the communication node by the newly added bit domain of a broadcast channel to instruct the terminal to determine the resources for transmitting the control channels.

Preferably, a value of the number N of repetitions of the control channels is taken as 4, 5, 6, 8, 10, 20, 40, 50, 80 or 100, and a value of the period M is taken as 40 ms, 80 ms, 160 ms, 320 ms or 1024 ms.

Preferably, the determining resources for transmitting the control channels according to predefined information further comprises determining the positions of the subframes of the control channels using one of the following methods after determining the starting subframes of the control channels:

method 1: N subframes transmitted repeatedly N times are occupied successively in a successive occupancy manner; and method 2: N subframes transmitted repeatedly N times are occupied in a T uniformly-spaced subframe occupancy manner.

Preferably, after determining the resources for transmitting the control channels, the method further comprises the communication node determining aggregation levels and search spaces of the control channels according to the number of repetitions of the control channels.

Preferably, an aggregation level of control channels, the number of repeated transmissions of which is greater than 1, in one subframe is less than or equal to an aggregation level of control channels, the number of transmissions of which is equal to 1, in one subframe; a search space of an aggregation level of control channels, the number of repeated transmissions of which is greater than 1, in one subframe is greater than a search space of a corresponding aggregation level of control channels, the number of transmissions of which is equal to 1, in one subframe.

Preferably, the aggregation levels and the search spaces of the control channels are the same as the corresponding aggregation levels and search spaces in each of the subframes occupied by the control channels, and the same candidate of the same aggregation level is selected by the communication node in the search space of each of the subframes occupied by the control channels.

Preferably, in a specific search space of the terminal corresponding to the communication node, a starting position of a control channel element (CCE) in each of the subframes is same, being 16 or =, wherein represents a starting position of a specific search space in a subframe with subframe number being k, represents a constant 39827, represents a value of Radio Network Temporary Identity (RNTI), and represents a constant 65537; or in a specific search space of the terminal corresponding to the communication node, a starting position of a CCE in each of the subframes is different according to the frame number of the radio frame and/or the number of repetitions.

Preferably, the method further comprises determining control information carried by the control channels after determining the resources for transmitting the control channels according to the predefined information, the control information including simplified resource allocation domain, simplified Modulation and Coding Scheme (MSC) level, the number of simplified Hybrid Automatic Repeat reQuest (HARM) processes, the number of repetitions of traffic channels and repeated subframes occupied by the traffic channels.

Preferably, the method further comprises determining timing relationship between the control channels and the traffic channels using one of the following methods after determining the resources for transmitting the control channels according to the predefined information:

method 1: a starting subframe of the repeated traffic channels is the same as that of the repeated control channels; and method 2: a starting subframe of the repeated traffic channels is the same as an end subframe of the repeated control channels; and method 3: a starting subframe of the repeated traffic channels and an end subframe of the repeated control channels are separated by r subframes, r≥0.

Preferably, the method further comprises determining the number of repetitions of the traffic channels after determining the resources for transmitting the control channels according to the predefined information, the number of repetitions of the traffic channels being respectively configured by the communication node according to the traffic channel type or fed back by the terminal corresponding to the communication node.

Preferably, the number of repetitions of the traffic channels is determined by factors, including channel type, coverage level, predefined period, the number of repeated transmissions of a main information block (MIB), Physical Random Access Channel (PRACH) format and downlink control information indication.

Preferably, the number of repetitions of the traffic channels carrying the common messages is determined according to the number of repeated transmissions of the MIB or the fixed number of repetitions is determined through the predefined period.

Preferably, the traffic channel type includes: a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels; or a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels; or a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels; or a kind of traffic channels scheduled by SI-RNTI-scrambled control channels, and a kind of downlink traffic channels scheduled by P-RNTI, RA-RNTI and C-RNTI-scrambled control channels.

Preferably, the method further comprises that:

the DCI format corresponding to the downlink control information is DCI format 0 or DCI format 1A when the downlink control information carried by the control channels is UE-specific downlink control information; and the number of candidates of aggregation levels corresponding to the downlink control information carried by the control channels is greater than or equal to the number of candidates of the existing same aggregation levels; or DCI format 0 and DCI format 1A have different sizes.

A method for processing transmission of control channels comprises:

a terminal determining resources for transmitting the control channels according to predefined information and detecting repeatedly the control channels multiple times on the determined resources for transmitting the control channels, the predefined information including at least one of following information: the number of repetitions of the control channels, control channel type, traffic channel type and traffic channel starting position.

Preferably, the resources for transmitting the control channels are at least located in two or more than two subframes or in one subframe where the number of Orthogonal Frequency Division Multiplexing (OFDM) symbols occupied by the control channels is greater than 3.

Preferably, the number of repetitions of the control channels is determined by factors, including one or more of coverage level, preamble of random access, random access response message, conflict resolution message, aggregation level, control information DCI format, control information type, system information and physical broadcast channel (PBCH) information, the PBCH information including the number of repetitions of the PBCH and/or signaling carried by the PBCH, and the control information type including cell specific information and UE specific information.

Preferably, the determining resources for transmitting the control channels according to predefined information comprises:

the terminal configuring respectively a starting subframe of control channels scheduling new transmission service messages and a starting subframe of control channels scheduling retransmission service messages according to the control channel type.

Preferably, the determining resources for transmitting the control channels according to predefined information comprises:

the terminal configuring independently a starting subframe of control channels scheduling the cell specific information and a starting subframe of control channels scheduling the specific information according to the control channel type.

Preferably, the starting subframe of the control channels is configured using one of the following methods:

method 1: the starting subframe of the control channels is determined according to a relation (k+h*n)mod N=0, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, and N represents the number of repetitions of the control channels;

method 2: the starting subframe of the control channels is determined according to a relation (k+h*n)mod M=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, ..., (M/N−1)*N};

method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, . . . , M/h}; and method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

Preferably, for the method 2, in Time Division Duplexing (TDD) systems, taking H half-frames as the period M, downlink control channel transmission is configured once within the period M, the number of subframes contained in the H half-frames being greater than or equal to N.

Preferably, the detecting repeatedly the control channels multiple times on the determined resources for transmitting the control channels comprises using uplink and downlink configuration 1, uplink and downlink configuration 2, uplink and downlink configuration 4 or uplink and downlink configuration 6 to perform downlink repeated detection of the control channels in TDD systems.

Preferably, the terminal receives one or more of the number N of repetitions of the control channels, the period M and m by the newly added bit domain of a broadcast channel before detecting the control channels, to determine the resources for transmitting the control channels.

Preferably, a value of the number N of repetitions of the control channels is taken as 4, 5, 6, 8, 10, 20, 40, 50, 80 or 100, and a value of the period M is taken as 40 ms, 80 ms, 160 ms, 320 ms or 1024 ms.

Preferably, the determining resources for transmitting control channels according to predefined information further comprises determining the positions of the subframes of the control channels using one of the following methods after determining the starting subframe of the control channels:

method 1: N subframes transmitted repeatedly N times are occupied successively in a successive occupancy manner; and method 2: N subframes transmitted repeatedly N times are occupied in a T uniformly-spaced subframe occupancy manner.

Preferably, after determining the resources for transmitting the control channels, the method further comprises:

the terminal determining aggregation levels and search spaces of the control channels according to the number of repetitions of the control channels.

Preferably, an aggregation level of control channels, the number of repeated transmissions of which is greater than 1, in one subframe is less than or equal to an aggregation level of control channels, the number of transmissions of which is equal to 1, in one subframe; a search space of an aggregation level of control channels, the number of repeated transmissions of which is greater than 1, in one subframe is greater than a search space of a corresponding aggregation level of control channels, the number of transmissions of which is equal to 1, in one subframe.

Preferably, the aggregation levels and the search spaces of the control channels are the same as the corresponding aggregation levels and search spaces in each of the subframes occupied by the control channels, and the same candidate of the same aggregation level is selected by a terminal in the search space of each of the subframes occupied by the control channels.

Preferably, in a specific search space of the terminal corresponding to the communication node, a starting position of a control channel element (CCE) in each of the subframes is same, being 16 or =, wherein represents a starting position of a specific search space in a subframe with subframe number being k, represents a constant 39827, represents a value of Radio Network Temporary Identity (RNTI), and represents a constant 65537; or in a specific search space of the terminal corresponding to the communication node, a starting position of a CCE in each of the subframes is different according to the frame number of the radio frame and/or the number of repetitions.

Preferably, the control information carried by the control channels includes simplified resource allocation domain, simplified Modulation and Coding Scheme (MSC) level, the number of simplified Hybrid Automatic Repeat reQuest (HARM) processes, the number of repetitions of traffic channels and repeated subframes occupied by the traffic channels.

Preferably, the method further comprises determining timing relationship between the control channels and the traffic channels using one of the following methods after determining the resources for transmitting the control channels according to the predefined information:

method 1: a starting subframe of the repeated traffic channels is the same as that of the repeated control channels; and method 2: a starting subframe of the repeated traffic channels is the same as an end subframe of the repeated control channels; and method 3: a starting subframe of the repeated traffic channels and end subframes of the repeated control channels are separated by r subframes, r≥0.

Preferably, the method further comprises:

determining the number of repetitions of the traffic channels after determining the resources for transmitting the control channels according to the predefined information, the number of repetitions of the traffic channels being respectively configured by the terminal according to the traffic channel type.

Preferably, the number of repetitions of the traffic channels is determined by factors, including channel type, coverage level, predefined period, the number of repeated transmissions of a main information block (MIB), Physical Random Access Channel (PRACH) format and downlink control information indication.

Preferably, the number of repetitions of the traffic channels carrying the common message is determined according to the number of repeated transmissions of the MIB or the fixed number of repetitions is determined through the predefined period.

Preferably, the traffic channel type includes: a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels; or a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels; or a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels; or a kind of traffic channels scheduled by SI-RNTI-scrambled control channels, and a kind of downlink traffic channels scheduled by P-RNTI, RA-RNTI and C-RNTI-scrambled control channels.

Preferably, the method further comprises that:

the DCI format corresponding to the downlink control information is DCI format 0 or DCI format 1A when the downlink control information carried by the control channels is UE-specific downlink control information; and the number of candidates of aggregation levels corresponding to the downlink control information carried by the control channels is greater than or equal to the number of candidates of the existing same aggregation levels; or DCI format 0 and DCI format 1A have different sizes.

A communication node comprises a resource determination unit and a channel transmission unit, wherein:

the resources determination unit is configured to determine resources for transmitting control channels according to predefined information, the predefined information including at least one of the following information: number of repetitions of the control channels, control channel type, traffic channel type and traffic channel starting position; and the channel transmission unit is configured to transmit repeatedly the control channels multiple times on the resources for transmitting the control channels determined by the resources determination unit.

Preferably, the resources for transmitting the control channels are at least located in two or more than two subframes or in one subframe where the number of Orthogonal Frequency Division Multiplexing (OFDM) symbols occupied by the control channels is greater than 3;

The number of repetitions of the control channels is determined by factors, including one or more of coverage level, preamble of random access, random access response message, conflict resolution message, aggregation level, control information DCI format, control information type, system information and physical broadcast channel (PBCH) information or further including the number of repetitions of the control channels fed back by a terminal corresponding to the communication node, the PBCH information including the number of repetitions of the PBCH and/or signaling carried by the PBCH, and the control information type including cell specific information and UE specific information.

Preferably, the resources determination unit is further configured to determine resources for transmitting control channels according to predefined information, comprising: configuring respectively a starting subframe of control channels scheduling new transmission service messages and a starting subframe of control channels scheduling retransmission service messages according to the control channel type; or configuring independently a starting subframe of control channels scheduling the cell specific information and a starting subframe of control channels scheduling the specific information according to the control channel type.

Preferably, the resource determination unit is configured to configure the starting subframe of the control channels using one of the following methods:

method 1: the starting subframe of the control channels is determined according to a relation $(k+h*n) \bmod N = 0$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, and N represents the number of repetitions of the control channels;

method 2: the starting subframe of the control channels is determined according to a relation $(k+h*n) \bmod M = m$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, M is a period, N represents the number of repetitions of the control channels, $N \leq M$, and m is a subset of a set $\{0, N, 2*N, \ldots, (M/N-1)*N\}$;

method 3: the starting subframe of the control channels is determined according to a relation $k=(Y+h*n1-N+1)$ or $k=(Y+h*n1-N)$ and $n \bmod M = m$, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, $N \leq M*h$, $m=0$, or m is a subset of a set $\{0, 1, 2, \ldots, M/h\}$; and method 4: the starting subframe of the control channels is determined according to a relation $(k+h*n) \bmod N = m$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, N represents the number of repetitions of the control channels, and m is a subset of a set $\{0, 1, \ldots, N-1\}$.

A terminal comprises a resource determination unit and a channel detection unit, wherein:

the resources determination unit is configured to determine resources for transmitting control channels according to predefined information, the predefined information including at least one of following information: the number of repetitions of the control channels, control channel type, traffic channel type and traffic channel starting position; and the channel detection unit is configured to detect repeatedly the control channels multiple times on the resources for transmitting the control channels determined by the resources determination unit.

Preferably, the resources for transmitting the control channels are at least located in two or more than two subframes or in one subframe where the number of Orthogonal Frequency Division Multiplexing (OFDM) symbols occupied by the control channels is greater than 3.

The number of repetitions of the control channels is determined by factors, including one or more of coverage level, preamble of random access, random access response message, conflict resolution message, aggregation level, control information DCI format, control information type, system information and physical broadcast channel (PBCH) information, the PBCH information including the number of repetitions of the PBCH and/or signaling carried by the PBCH, and the control information type including cell specific information and UE specific information.

Preferably, the resources determination unit is further configured to determine resources for transmitting control channels according to predefined information, comprising: configuring respectively a starting subframe of control channels scheduling new transmission service messages and a starting subframe of control channels scheduling retransmission service messages according to the control channel type; or configure independently a starting subframe of control channels scheduling the cell specific information and a starting subframe of control channels scheduling the specific information according to the control channel type.

Preferably, the resource determination unit is configured to configure the starting subframe of the control channels using one of the following methods:

method 1: the starting subframe of the control channels is determined according to a relation (k+h*n)mod N=0, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, and N represents the number of repetitions of the control channels;

method 2: the starting subframe of the control channels is determined according to a relation (k+h*n)mod M=m, where k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, . . . , (M/N−1)*N};

method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, . . . , M/h}; and method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

To sum up, embodiments of the present document solve the technical problem of repeated transmissions of downlink control channels being unable to be performed in LTE systems, and therefore implement repeated transmissions of the control channels at the network side in the presence of coverage enhancement requirements so as to ensure that a terminal having the coverage enhancement requirements can receive correctly control information sent by a base station, further ensuring the corresponding data transmission.

PREFERRED EMBODIMENTS OF THE PRESENT DOCUMENT

Figure 1:
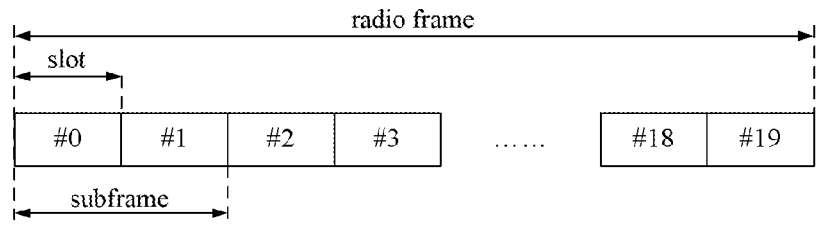
FIG. 1 is a schematic diagram of a FDD frame structure in LTE systems in accordance with the related art.
Figure 2:
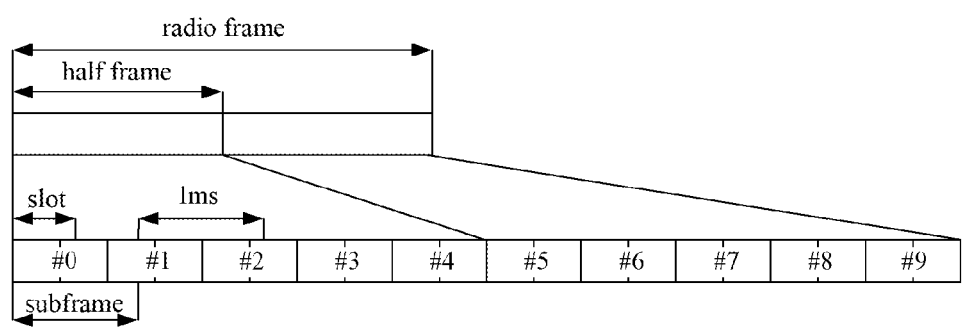
FIG. 2 is a schematic diagram of a TDD frame structure in LTE systems in accordance with the related art.

In order to implement coverage enhancement requirements of control channels by repeated transmissions, the present application proposes a method for transmitting control channels so as to solve the problem of MTC terminals having the coverage enhancement requirements receiving the control channels in LTE systems, and ensure normal communication requirements of the terminal on the premise that system overhead of base stations can be decreased as low as possible.

In LTE systems, using control channels for repeated transmissions needs to solve some problems, such as repeated starting subframe, the number of repetitions, blind detection reception, timing relationship with traffic channels with schedule indication, etc., efficient solutions to which have not been proposed yet. Moreover, since in practical applications a variety of coverage level requirements exist in low coverage scenes, there are various designs for the corresponding repeated transmissions.

In the present application, a communication node determines resources for transmitting the control channels according to predefined information and transmitting repeatedly the control channels multiple times on the determined resources for transmitting the control channels, the predefined information including at least one of the following information: the number of repetitions of the control channels, control channel type, traffic channel type and traffic channel starting position. The communication node may be a base station or an upper network element.

Further, the resources for transmitting the control channels are at least located in two or more than two subframes or in one subframe where the number of OFDM symbols occupied by the control channels is greater than 3.

Further, the determining resources for transmitting the control channels according to predefined information comprises configuring respectively a starting subframe (position) of control channels scheduling new transmission service messages and a starting subframe of control channels scheduling retransmission service messages according to the control channel type.

For example, specifically, the starting position of the control channels scheduling the uplink new transmission service messages is at subframe 0 of radio frame 15, and the PUSCH begins to be transmitted repeatedly for four times at subframe 7 of radio frame 15. A base station receives error after 6 transmissions of the uplink PUSCH, at which point the starting position of the control channels where the base station schedules retransmission uplink service messages is subframe 6 of radio frame 16.

For example, specifically, the starting position of the control channels scheduling the uplink new transmission service messages is at subframe 0 of radio frame 15, and the PUSCH begins to be transmitted repeatedly for 4 times at subframe 0 of radio frame 16. A base station receives error after 6 transmissions of the uplink PUSCH, at which point the starting position of the control channels where the base station schedules retransmission uplink service messages is subframe 0 of radio frame 17.

Further, the determining the resources for transmitting the control channels according to predefined information comprises configuring independently starting subframes (which can be configured to be same or different) of downlink control channels scheduling cell specific information and specific information according to the control channel type. Specifically, the starting position of SI-RNTI, P-RNTI and RA-RNTI-scrambled control channels (scheduling indicates the public messages) and the starting position of C-RNTI-scrambled control channels (scheduling indicates the specific messages) are configured respectively.

For example, specifically, the starting position of SI-RNTI, P-RNTI and RA-RNTI-scrambled control channels (scheduling indicates the public messages) is configured according to the number of repetitions of the control channels on the premise of ensuring that the starting subframe of the cell specific information is 0 and 5, and the starting position of C-RNTI-scrambled control channels (scheduling indicates the specific messages) can be configured arbitrarily.

For example, specifically, the starting position of SI-RNTI, P-RNTI and RA-RNTI-scrambled control channels (scheduling indicates the public messages) is configured at subframe 0 fixedly, and the starting position of C-RNTI-scrambled control channels (scheduling indicates the specific messages) can be configured arbitrarily.

Further, the configured starting position of the control channels is determined by a predefined manner, specifically, is determined by one of the following methods.

Figure 12:
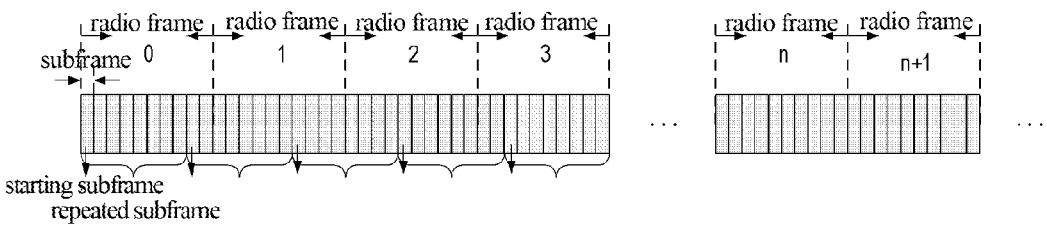
FIG. 12 is a schematic diagram of the first method for determining a starting subframe in accordance with an embodiment of the present document.

Method 1: refer to FIG. 12, taking the first downlink subframe in the starting radio frame as the starting subframe and taking N subframes as a unit group, downlink subframes are divided sequentially, wherein N is the number of repetitions of the downlink control channels, which are transmitted in the unit group by the base station.

Specifically, the formula for determining the starting position is as follows: the starting subframe of the control channels satisfies a relation $(k+h*n) \mod N=0$, wherein k represents a serial number of an available downlink subframe in a radio frame in which the starting subframe of the control channels is located (in TDD, it is renumbered in an order according to the available downlink subframes in the radio frame), $0 \le k \le h-1$, n represents a frame number of the radio frame in which the starting subframe of the control channels is located, h is the number of the available downlink subframes contained in one radio frame, and N represents the number of repetitions of transmitting the control channels.

Figure 13:
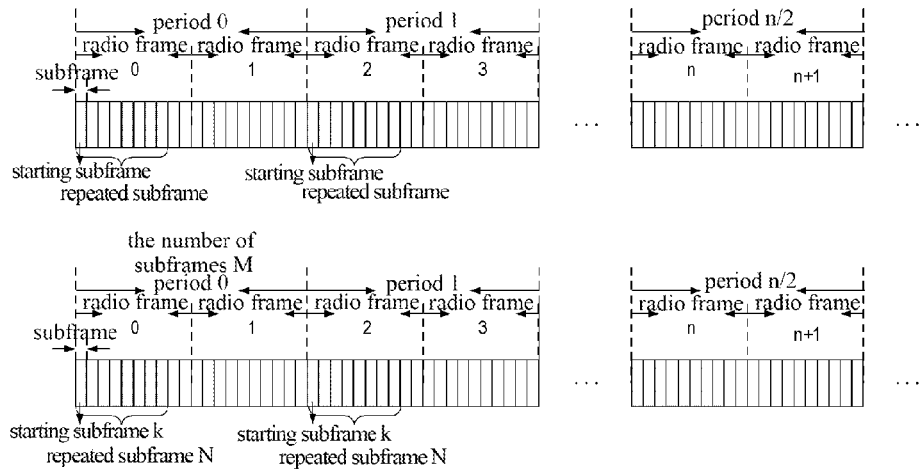
FIG. 13 is a schematic diagram of the second method for determining a starting subframe in accordance with an embodiment of the present document.

Method 2: refer to FIG. 13, there are one or more starting subframe positions of the control channels in the period M.

Taking the first downlink subframe in the starting radio frame as the starting subframe and taking N subframes as a unit group, downlink subframes are divided sequentially, wherein N is the number of repetitions of the control channels, and the downlink control channels are transmitted in one unit group in the period M by the base station. Specifically, the formula for determining the starting position is as follows: the starting subframe of the control channels satisfies a relation $(k+h*n) \mod M=m$, wherein k represents a serial number of an available downlink subframe in a radio frame in which the starting subframe of the control channels is located (in TDD, it is renumbered in an order according to the available downlink subframes in the radio frame), $0 \le k \le h-1$, n represents a frame number of the radio frame in which the starting subframe of the control channels is located, h is the number of available downlink subframes contained in one radio frame, M is a period, N represents the number of repetitions of transmitting the control channels, $N \le M$, and m is a subset of a set $\{0, N, 2*N, \ldots, (M/N-1)*N\}$.

Further, in TDD systems, taking H half frames as a unit frame (i.e., period M), one transmission of the downlink control channels is configured in the unit frame. The number of subframes contained in the H half frames is greater than or equal to N, wherein N is the number of repetitions of the downlink control channels.

Method 3: the starting subframe of the control channels is determined according to the starting subframe of the traffic channels.

Specifically, the position of starting subframe satisfies a relation k=(Y+h*n1−N+1) or k=(Y+h*n1−N), and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetition subframes of the control channels, N≤M*h, preferably m=0, or m is a subset of a set {0, 1, 2, . . . , M/h. When Y represents the repeated starting subframe of the traffic channels carrying the public messages, preferably Y=0, 5; When Y represents the repeated starting subframe of the traffic channels carrying the specific messages, there is no preferred value for Y.

Method 4: there is a plurality of starting subframe positions of the control channels in a unit group containing N subframes.

Specifically, it satisfies a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of transmitting the control channels, and m is a subset of a set {0, 1, . . . , N−1}.

For methods 1 to 4, further, in TDD systems, preferably uplink and downlink configurations 1, 2, 4 or 6 are used for downlink repeated transmission.

Further, the method in accordance with the present document further comprises determining the starting position of the control channels by dynamic indication. Specifically, the communication node, before transmitting the control channels, indicates one or more of the number N of repetitions of the control channels which are transmitted repeatedly, the period M and the value of m by the newly added bit domain of a broadcast channel to instruct a terminal to determine the resources for transmitting the control channels.

For example, specifically, 3 bit is selected in a spare region of a MIB message to indicate the value of N, a set of which is {4, 5, 6, 8, 10, 20, 50, 100}. The starting position of the control channels is determined according to method 1.

For example, specifically, 3 bit is selected in a spare region of a MIB message to indicate the value of N, a set of which is {4, 5, 6, 8, 10, 20, 50, 100}, and 2 bit is selected in a spare region of the MIB message to indicate the value of m, a set of which is {40, 80, 160, 320}, at which point m is equal to 0 by default. The starting position of the control channels is determined according to method 2.

For example, specifically, 3 bit is selected in a spare region of a MIB message to indicate the value of N, a set of which is {4, 5, 6, 8, 10, 20, 50, 100}, 2 bit is selected in a spare region of the MIB message to indicate the value of M, a set of which is {40, 80, 160, 320}, and 2 bit is selected in a spare region of the MIB message to indicate the value of m, a set of which is {{0}, {0, 1}, {0, 2, 4}, {0, M/2 h, M/h}}. The starting position of the control channels is determined according to method 3.

Further, when the starting position of the control channels is determined in a predefined manner or determined through dynamic indication, the preferred value of the number N of repetitions is 4, 5, 6, 8, 10, 20, 40, 50, 80 or 100, and the preferred period M is 40 ms, 80 ms, 160 ms, 320 ms or 1024 ms.

Further, in the present application, the determining resources for transmitting the control channels according to predefined information further comprises determining the subframe positions of the control channels using one of the following methods after determining the starting subframes of the control channels.

Figure 3:
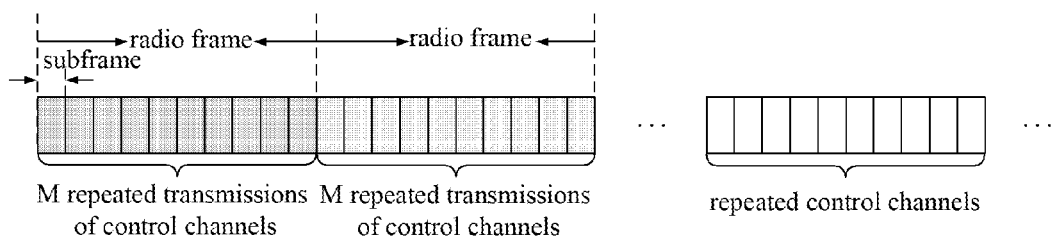
FIG. 3 is a schematic diagram of repeatedly transmitted control channels occupied in a successive subframe manner in accordance with an embodiment of the present document.

Process 1: N subframes transmitted repeatedly N times are occupied successively in a successive occupancy manner after the starting subframe is determined, as shown in FIG. 3.

Further, the successive occupancy manner may be succession after a part of special subframes are skipped or succession over the configured dedicated MTC subframes.

Specifically, the skipped special subframes may be the system configured MBSFN subframes, ABS subframes, etc. The configured dedicated MTC subframes are a part of subframes of a radio frame or all of subframes on a part of radio frames.

Figure 4:
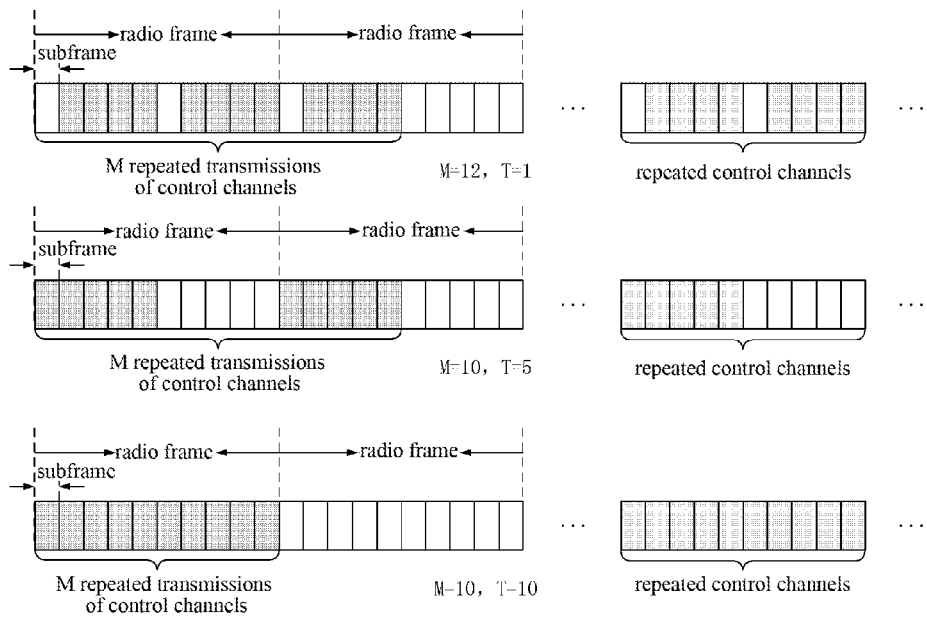
FIG. 4 is a schematic diagram of repeatedly transmitted control channels occupied in a T uniformly-spaced subframe occupancy manner in accordance with an embodiment of the present document.

Method 2: N subframes transmitted repeatedly N times are occupied in a T uniformly-spaced subframe occupancy manner after the starting subframe is determined, as shown in FIG. 4.

Further, the T uniformly-spaced subframe occupancy described in method 2 is determined by one of the following modes.

Mode 1: T=1, 4 subframes, preferably subframes 1, 2, 3, 4 or subframes 6, 7, 8, 9, in the radio frame are occupied as a group.

Mode 2: T=5, subframes are occupied by taking a half frame as a unit and separated by taking a half frame as a unit.

Mode 3: T=10, subframes are occupied by taking a radio frame as a unit and separated by taking a radio frame as a unit.

Specifically, for modes 1 to 3, the successive occupancy is performed with the separated subframes being skipped when the occupied subframes are transmitted repeatedly.

For example, specifically, in FDD, when the starting subframe is determined to be subframe 0 of radio frame 1, the number of repetitions N equals 12. For mode 1, subframe 1, 2, 3, 4, 6, 7, 8, 9 of radio frame 15 and subframes 1, 2, 3, 4 of radio frame 16 are occupied; for mode 2, subframe 0, 1, 2, 3, 4 of radio frame 15, subframes 0, 1, 2, 3, 4 of radio frame 16 and subframes 0, 1 of radio frame 17 are occupied; and for mode 3, all of 10 subframes of radio frame 15 and subframes 0, 1 of radio frame 17 are occupied.

In TDD, the available downlink subframes are occupied sequentially according to different uplink and downlink configurations. For example, when the starting subframe is determined to be subframe 0 of radio frame 15, the number of repetitions equals 12. In the case of uplink and downlink subframe configuration 1, for mode 1, subframes 1, 4, 6, 9 of radio frames 15 to 17 are occupied; for mode 2, subframes 0, 1, 4 of radio frames 15 to 18 are occupied; and for mode 3, subframes 0, 1, 4, 5, 6, 9 of radio frames 15 to 17 are occupied.

Further, the number of repetitions of the control channels (the number of repetitions) is determined by factors, including one or more of coverage level, preamble of random access, random access response message, conflict resolution message, aggregation level, control information DCI format, control information type, system information and physical broadcast channel (PBCH) information or further including the feedback from the terminal corresponding to the communication node to the communication node. The PBCH information includes the number of repetitions of the PBCH and/or signaling carried by the PBCH, and the control information type includes cell specific information and UE specific information.

Specifically, after the coverage level is determined, the number of repetitions of the control channels is further determined in conjunction with the aggregation level and different DCI formats.

Specifically, the coverage level may be obtained by receiving random access preambles or the number of repetitions is obtained directly by receiving random access preambles. The base station side corresponds to different coverage levels or corresponds to different numbers of repetitions of the control channels by receiving the random access preambles with different numbers of repetitions.

Further, the number of repetitions of the control channels is defined according to the predefined aggregation level and DCI format, and other aggregation levels and DCI formats are adjusted in equal proportion according to the predefined aggregation level and DCI format. One of possible methods for determining the number of repetitions is as shown in table 1. (now DCI format 0/1A is used and only a method for repeating transmission is used.)

TABLE 1

| Coverage level (dB) | Aggregation level L | Number N of repetitions |
| --- | --- | --- |
| 5 (level 1) | Aggregation level 1 | 24 |
|  | Aggregation level 2 | 12 |
|  | Aggregation level 3 | 6 |
|  | Aggregation level 4 | 3 |
| 10 (level 2) | Aggregation level 1 | 80 |
|  | Aggregation level 2 | 40 |
|  | Aggregation level 3 | 20 |
|  | Aggregation level 4 | 10 |
| 15 (level 3) | Aggregation level 1 | 240 |
|  | Aggregation level 2 | 120 |
|  | Aggregation level 3 | 60 |
|  | Aggregation level 4 | 30 |
| 20 (level 4) | Aggregation level 1 | 800 |
|  | Aggregation level 2 | 400 |
|  | Aggregation level 3 | 200 |
|  | Aggregation level 4 | 100 |

In this table, aggregation levels 1 to 4 are L=1, 2, 4, 8, or aggregation levels 1 to 4 are L=2, 4, 8, 16, or aggregation levels 1 to 4 are L=4, 8, 16, 32, etc.

Further, one of possible methods for determining the number of repetitions is as shown in table 2. (now DCI format 0/1A and aggregation level L=8 are used, format 1A/1B is used by the PUCCH and only a method for repeating transmission is used.) Furthermore, the PUCCH determines the number of repetitions according to the coverage level or signaling indication.

TABLE 2

| Coverage level (dB) | Number N of repetitions of PDCCH | Number N of repetitions of PUCCH |
| --- | --- | --- |
| 20 dB | 100 | 50 |
| 15 dB | 20 | 10 |
| 10 dB | 4 | 2 |
| 5 dB | — | — |

Furthermore, one of possible methods for determining the number of repetitions is as shown in table 3. (now DCI format 0/1A is used, and only a method for repeating transmission is used.)

TABLE 3

| Aggregation level L | Number N of repetitions |
| --- | --- |
| Aggregation level 1 | 20 |
| Aggregation level 2 | 10 |

In this table, aggregation levels 1 to 2 are L=4, 8, or aggregation levels 1 to 2 are L=8, 16, or aggregation levels 1 to 2 are L=16, 32, etc.

Furthermore, different numbers of repetitions are used by the corresponding DCI format 1C and DCI format 1A/0. One of possible methods for determining the number of repetitions is as shown in table 4.

TABLE 4

| DCI format | Number N of repetitions |
| --- | --- |
| Format 1C | 10 |
| Format 0/1A | 20 |

Further, in the present application, after determining the resources for transmitting the control channels, the method further comprises determining aggregation levels and search spaces of the control channels according to the number of repetitions.

Furthermore, an aggregation level of control channels, the number of repetitions of which is greater than 1, in a subframe is less than or equal to an aggregation level of control channels, the number of repetitions of which is equal to 1, in a subframe; a search space of the same aggregation level of control channels, the number of repetitions of which is greater than 1, in a subframe is greater than a search space of the corresponding aggregation level of control channels, the number of repetitions of which is equal to 1, in a subframe.

For example, specifically, the number of aggregation levels of the control channels, the number of repetitions of which is equal to 1, in a subframe is 4, and the number of aggregation levels of the control channels, the number of repetitions of which is greater than 1, in a subframe is 2.

For example, specifically, there are 2 candidates in the search space of aggregation level 4 of the control channels, the number of repetitions of which is equal to 1, in a subframe, and there are 4 candidates in the search space of aggregation level 2 of the control channels, the number of repetitions of which is greater than 1, in a subframe. The size of resources contained in aggregation level 4 of the control channels, the number of repetitions of which is equal to 1, is the same as that in aggregation level 2 of the control channels, the number of repetitions of which is greater than 1.

Furthermore, in the present application, the aggregation levels and the search spaces of the repeated control channels are the same as the corresponding aggregation levels and the search spaces in each of the repeated subframes, and the same candidate of the same aggregation level is selected in the search space of each of the repeated subframes when the base station performs scheduling.

Furthermore, in the present application, the search spaces of the control channels can be determined specifically as follows.

Specifically, upon blind detection of single-subframe control channels (when CA is not contained, $n_{CI}=0$, $m'=m+M^{(L)} \cdot n_{CI}$ is degenerated to m), the position of a CCE is required to be found, the search space is determined through $L \cdot \{(Y_k+m) \bmod \lfloor N_{CCE,k}/L \rfloor\}+i$, and candidates corresponding to different aggregation levels L are detected in turn in the search space. When multiple subframes are transmitted repeatedly, time domain energy is required to be accumulated and complexity of blind detection can not be increased. Therefore, it is required that serial numbers of the candidates (i.e., positions of the CCEs in the candidates) selected by each of the repeated subframes in the candidates with the same aggregation level be same, i.e., the values of m are same.

Further, in the present document, the search space may be expanded in each subframe, specifically, low aggregation level is decreased and the search space of high aggregation level is expanded, as shown in Table 5 and 6. The common search space and specific search space are not distinguished or collectively known as common search space, and the search space of the corresponding aggregation level is expanded, as shown in Table 7 and 8. The aggregation levels of the UE-specific search space and common search space are decreased, and the search spaces of the remaining aggregation levels are expanded, as shown in Table 9. The common search spaces and specific search spaces correspond to different aggregation levels, as shown in Table 10.

Furthermore, the common search space is positions corresponding to all available CCEs. For example, the number of candidates corresponding to the common search space is floor ($N_{CCE,k}/L$), wherein $N_{CCE,k}$ is the total number of the CCEs available to the current subframe k.

When the control channel is the ePDCCH, the CCE described above is eCCE; when the control channel is the PDCCH, the CCE described above is CCE.

TABLE 5

Search space

| Type | Aggregation level L | Size [CCEs] | Candidate $M^{(L)}$ |
|---|---|---|---|
| UE-specific search space | 4 | 8 | 2 |
|  | 8 | 32 | 4 |
| Common search space | 4 | 16 | 4 |
|  | 8 | 32 | 4 |

TABLE 6

Search space

| Type | Aggregation level L | Size [CCEs] | Candidate $M^{(L)}$ |
|---|---|---|---|
| UE-specific search space | 2 | 12 | 6 |
|  | 4 | 8 | 2 |
|  | 8 | 32 | 4 |
| Common search space | 4 | 16 | 4 |
|  | 8 | 32 | 4 |

TABLE 7

Search space

| Type | Aggregation level L | Size [CCEs] | Candidate $M^{(L)}$ |
|---|---|---|---|
| Search space | 4 | 32 | 8 |
|  | 8 | 40 | 5 |

TABLE 8

Search space

| Type | Aggregation level L | Size [CCEs] | Candidate $M^{(L)}$ |
|---|---|---|---|
| Search space | 8 | 40 | 5 |

TABLE 9

Search space

| Type | Aggregation level L | Size [CCEs] | Candidate $M^{(L)}$ |
|---|---|---|---|
| UE-specific search space | 8 | 32 | 4 |
| Common search space | 8 | 32 | 4 |

TABLE 10

Search space

| Type | Aggregation level L | Size [CCEs] | Candidate $M^{(L)}$ |
|---|---|---|---|
| UE-specific search space | 4 | 32 | 8 |
| Common search space | 8 | 32 | 4 |

Further, since downlink bandwidth limitation is 1.4 M, which may be central 1.4 MHz bandwidth or discrete 1.4 MHz bandwidth or configurable 1.4 MHz bandwidth, when downlink transmission mode 1 or downlink transmission mode 2 is configured, the UE can detect DCI format 1A instead of DCI format 1. This is further repeated once more and the search space corresponding to the terminal where the bandwidth of the traffic channels is limited is expanded, as shown in table 11 specifically.

TABLE 11

Search space

| Type | Aggregation level L | Size [CCEs] | Candidate $M^{(L)}$ |
|---|---|---|---|
| UE-specific search space | 1 | 12 | 12 |
|  | 2 | 24 | 12 |
|  | 4 | 16 | 4 |
|  | 8 | 32 | 4 |
| Common search space | 4 | 16 | 4 |
|  | 8 | 16 | 2 |

For the terminal where the bandwidth of the traffic channels is limited, the overhead of DCI format 0 and DCI format 1A (when the system bandwidth is not the predefined bandwidth) is different, and the terminal performs detection according to the respective overhead of DCI format 0 and DCI format 1A. Further, the terminal performs detection in the specific search space according to two different overheads of DCI format 0 and DCI format 1A respectively. Further, the terminal detects in the common search space DCI format 1C and DCI format 1A instead of DCI format 0.

Further, in the UE-specific search space, the starting position of the control channel element (CCE) in each of the subframes is same. Preferably, $Y_k$ is 16 or $Y_k=(A \cdot n_{RNTI}) \bmod D$, where $Y_k$ represents the starting position of the specific search space in a subframe with subframe number being k, A represents a constant 39827, $n_{RNTI}$ represents a value of Radio Network Temporary Identity (RNTI), and D represents a constant 65537.

Further, in the UE-specific search space, the starting position of the CCE in each of the subframes is different according to the frame number of the radio frame and/or the number of repetitions. Preferably, $Y_k=(A \cdot k \cdot SFN \cdot n_{RNTI}) \mod D$, or $Y_k=(A \cdot SFN \cdot Y_{k-1}) \mod D$, or $Y_k=(A \cdot SFN \cdot Y_{k-1}) \mod D$ and $K=k+SFN*10$, wherein k represents a serial number of the starting subframe of the control channels in the radio frame, and SFN represents a frame number of the radio frame.

Further, control information carried by the control channels is determined after the resources for transmitting the control channels are determined according to the predefined information. The control information at least includes one of the following information:

simplified resource allocation domain, simplified Modulation and Coding Scheme (MSC) level, the number of simplified Hybrid Automatic Repeat reQuest (HARQ) processes, the number of repetitions of traffic channels and repeated subframes occupied by the data channels.

Specifically, the simplified resource allocation domain is no longer calculated based on system bandwidth, and the resource allocation calculation is based on central 1.4 MHz bandwidth or discrete 1.4 MHz bandwidth or configurable 1.4 MHz bandwidth. The simplified MSC level uses a QPSK modulation manner fixedly. The number of the simplified HARQ processes is 1. The number of repetitions of data channels is selected in a finite set, and the preferred finite set is {4, 10, 20, 50, 100, 200, 300, 400}. Repeated subframe occupancy indicates subframes that can be occupied in a radio frame. Preferably, bits 1001111111 indicates subframes 0, 3, 4, 5, 6, 7, 8, 9 in a radio frame which can be occupied repeatedly by traffic channels.

The DCI format corresponding to the downlink control information is DCI format 0 or DCI format 1A when the downlink control information carried by the control channels is UE-specific downlink control information.

The number of candidates of aggregation levels corresponding to the downlink control information carried by the control channels is greater than or equal to the number of candidates of the existing same aggregation levels; or DCI format 0 and DCI format 1A have different sizes.

Further, when there is no repeated subframe occupancy indication of the data channels, a successive subframe occupancy manner will be used by default.

Further, the successive subframe occupancy manner may be succession after a part of special subframes are skipped.

Further, the repeatedly transmitted multiple subframes carry the same control information.

Further, timing relationship between the control channels and the traffic channels is determined using one of the following methods after the resources for transmitting the control channels is determined according to the predefined information.

Method 1: a starting subframe of the repeated traffic channels is the same as that of the repeated control channels.

Figure 5:
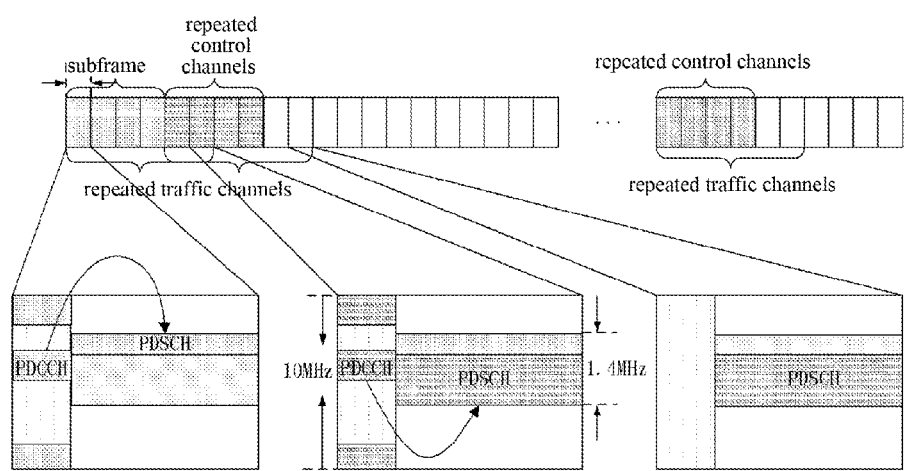
FIG. 5 is a schematic diagram of a situation where a starting subframe of the repeated traffic channels is the same as that of the repeated control channels.

Further, for method 1, both the repeated traffic channels and the repeated control channels begin with the same subframe, as shown in FIG. 5. Before the detected control channels are received, all service data information on central 1.4 MHz bandwidth or discrete 1.4 MHz bandwidth or configurable 1.4 MHz bandwidth is required to be stored.

Method 2: a starting subframe of the repeated traffic channels is the same as an end subframe of the repeated control channels.

Figure 6:
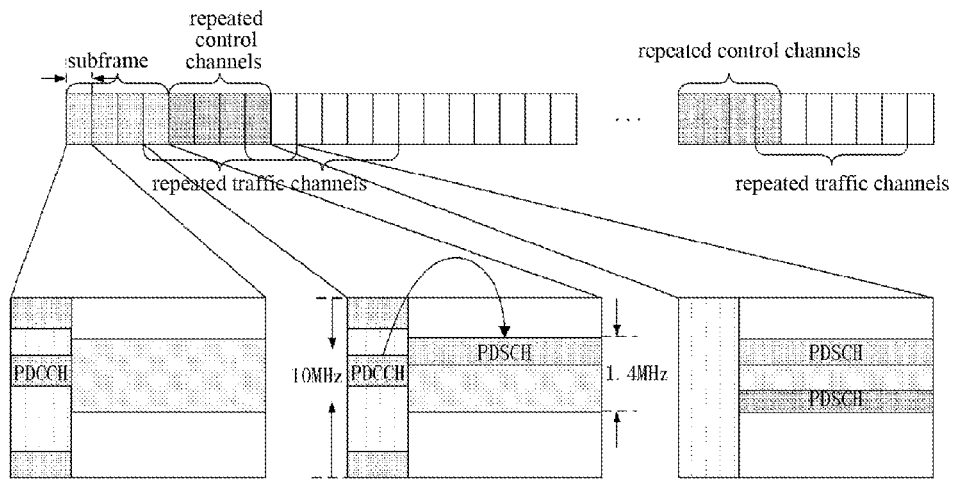
FIG. 6 is a schematic diagram of a situation where a starting subframe of the repeated traffic channels is the same as an end subframe of the repeated control channels in accordance with an embodiment of the present document.

Further, for method 2, both the starting subframe of the repeated traffic channels and the end subframe of the repeated control channels are same, as shown in FIG. 6.

Now according to the control information demodulated from the repeatedly transmitted control channels, the base station, beginning with the present subframe, receives the traffic channel which is scheduled and indicated by demodulating the control channels.

Method 3: a starting subframe of the repeated traffic channels and an end subframe of the repeated control channels are separated by r subframes, r≥0.

Figure 7:
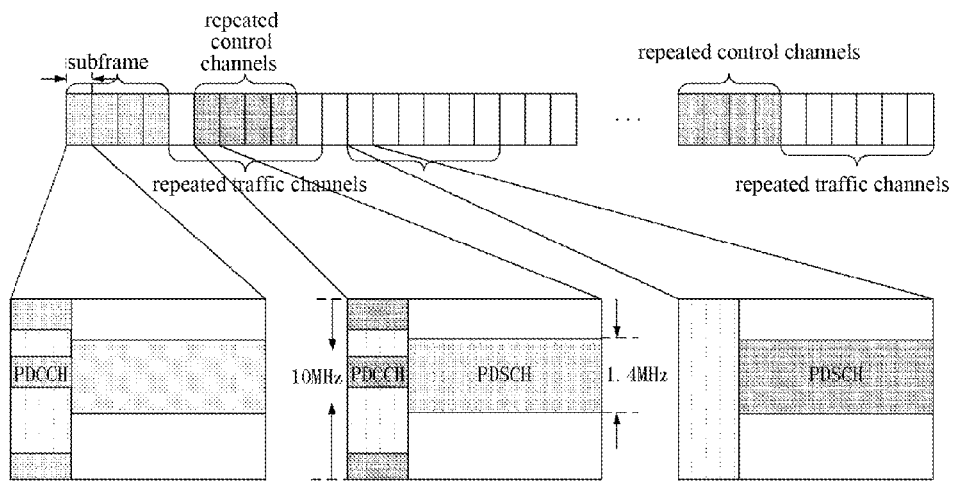
FIG. 7 is a schematic diagram of a situation where a starting subframe of the repeated traffic channels and an end subframe of the repeated control channels are separated by r subframes in accordance with an embodiment of the present document.

Further, for method 3, as shown in FIG. 7, the starting subframe of the repeated traffic channels can begin with one subframe immediately after the transmission of the repeated control channels is completed, i.e., separated by k=0 subframes. The starting subframe of the repeated traffic channels can also be transmitted through beginning with several subframes after the transmission of the control channels is completed, i.e., separated by k>0 subframes.

Further, in the present application, the number of repetitions of the traffic channels is determined after the resources for transmitting the control channels are determined according to the predefined information. Determining of the number of repetitions of the traffic channels includes configuring the number of repetitions respectively according to the traffic channel type or feeding back the number of repetitions by the terminal to its corresponding communication node.

Further, the number of repetitions of the traffic channels is determined by factors, including channel type, coverage level, predefined period, the number of repeated transmissions of a main information block (MIB), Physical Random Access Channel (PRACH) format and downlink control information indication.

Further, the traffic channel type includes a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels.

Or the traffic channel type includes a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels.

Or, the traffic channel type includes a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels.

Or the traffic channel type includes a kind of traffic channels scheduled by SI-RNTI-scrambled control channels, and a kind of downlink traffic channels scheduled by P-RNTI, RA-RNTI and C-RNTI-scrambled control channels.

Specifically, for example, the number of repetitions of the traffic channels scheduled by SI-RNTI, P-RNTI and RA-RNTI-scrambled control channels is 100, and the number of repetitions of the downlink traffic channels scheduled by C-RNTI-scrambled control channels is 200. Or the number of repetitions of the traffic channels scheduled by SI-RNTI-scrambled control channels is 100, the number of repetitions of the traffic channels scheduled by P-RNTI and RA-RNTI-scrambled control channels is 200, and the number of repetitions of the downlink traffic channels scheduled by C-RNTI-scrambled control channels is 50. Or the number of repetitions of the traffic channels scheduled by SI-RNTI-scrambled control channels is 20, the number of repetitions of the traffic channels scheduled by P-RNTI-scrambled control channels is 50, the number of repetitions of the traffic channels scheduled by RA-RNTI-scrambled control channels is 100, and the number of repetitions of the downlink traffic channels scheduled by C-RNTI-scrambled control channels is 200. Or the number of repetitions of the traffic channels scheduled by SI-RNTI-scrambled control channels is 50, and the number of repetitions of the downlink traffic channels scheduled by P-RNTI, RA-RNTI and C-RNTI-scrambled control channels is 100.

Specifically, the number of repetitions of the traffic channels (such as the traffic channels scheduled by SI-RNTI-scrambled control channels) carrying the cell specific information is determined according to the number of repeated transmissions of the MIB or the fixed number of repetitions is determined by the predefined period.

Specifically, the numbers of repetitions of the PDSCH and PUSCH are configured respectively, the fixed numbers of repetitions of the PDSCH and PUSCH are determined according to the coverage level, or the fixed number of repetitions of the PUSCH is determined through the number of repetitions of the PDSCH indicated by the downlink control information and according to the coverage level. One of possible methods for determining the number of repetitions is as shown in table 12.

TABLE 12

| Coverage level (dB) | Number N of repetitions of PDSCH | Number N of repetitions of PUSCH |
|---|---|---|
| 20 dB | 200 | 300 |
| 15 dB | 50 | 100 |
| 10 dB | 10 | 20 |
| 5 dB | — | 4 |

The present application further provides a method for processing transmission of control channels, which is a processing method at the terminal side corresponding to the method for transmitting the control channels described above.

The method for processing transmission of the control channels comprises a terminal determining resources for transmitting the control channels according to predefined information and detecting repeatedly the control channels multiple times on the determined resources for transmitting the control channels, the predefined information including at least one of the following information: the number of repetitions of the control channels, control channel type, traffic channel type and traffic channel starting position.

The resources for transmitting the control channels are at least located in two or more than two subframes or in one subframe where the number of Orthogonal Frequency Division Multiplexing (OFDM) symbols occupied by the control channels is greater than 3.

The number of repetitions of the control channels is determined by factors, including one or more of coverage level, preamble of random access, random access response message, conflict resolution message, aggregation level, control information DCI format, control information type, system information and physical broadcast channel (PBCH) information, the PBCH information including the number of repetitions of the PBCH and/or signaling carried by the PBCH, and the control information type including cell specific information and UE specific information.

The determining resources for transmitting the control channels according to predefined information comprises the terminal configuring respectively a starting subframe of control channels scheduling new transmission service messages and a starting subframe of control channels scheduling retransmission service messages according to the control channel type.

The determining resources for transmitting the control channels according to predefined information comprises the terminal configuring independently a starting subframe of control channels scheduling the cell specific information and a starting subframe of control channels scheduling the specific information according to the control channel type.

The starting subframe of the control channels is configured using one of the following methods.

Method 1: the starting subframe of the control channels is determined according to a relation $(k+h*n) \mod N=0$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, and N represents the number of repetitions of the control channels.

Method 2: the starting subframe of the control channels is determined according to a relation $(k+h*n) \mod M=m$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, M is a period, N represents the number of repetitions of the control channels, $N \leq M$, and m is a subset of a set $\{0, N, 2*N, \ldots, (M/N-1)*N\}$.

Method 3: the starting subframe of the control channels is determined according to a relation $k=(Y+h*n1-N+1)$ or $k=(Y+h*n1-N)$ and $n \mod M=m$, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, $N \leq M*h$, $m=0$, or m is a subset of a set $\{0, 1, 2, \ldots, M/h\}$.

Method 4: the starting subframe of the control channels is determined according to a relation $(k+h*n) \mod N=m$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, N represents the number of repetitions of the control channels, and m is a subset of a set $\{0, 1, \ldots, N-1\}$.

For the method 2, in Time Division Duplexing (TDD) systems, taking H half-frames as the period M, downlink control channel transmission is configured once within the period M, the number of subframes contained in the H half-frames being greater than or equal to N.

The detecting repeatedly the control channels multiple times on the determined resources for transmitting the control channels comprises using uplink and downlink configuration 1, uplink and downlink configuration 2, uplink and downlink configuration 4 or uplink and downlink configuration 6 to perform downlink repeated detection of the control channels in TDD systems.

The terminal receives one or more of the number N of repetitions of the control channels, the period M and m by the newly added bit domain of a broadcast channel before detecting the control channels, to determine the resources for transmitting the control channels.

The value of the number N of repetitions of the control channels is taken as 4, 5, 6, 8, 10, 20, 40, 50, 80 or 100, and the value of the period M is taken as 40 ms, 80 ms, 160 ms, 320 ms or 1024 ms.

The determining resources for transmitting the control channels according to predefined information further comprises determining the positions of the subframes of the control channels using one of the following methods after determining the starting subframe of the control channels.

Method 1: N subframes transmitted repeatedly N times are occupied successively in a successive occupancy manner.

Method 2: N subframes transmitted repeatedly N times are occupied in a T uniformly-spaced subframe occupancy manner.

After determining the resources for transmitting the control channels, the method further comprises the terminal determining aggregation levels and search spaces of the control channels according to the number of repetitions of the control channels.

An aggregation level of control channels, the number of repeated transmissions of which is greater than 1, in one subframe is less than or equal to an aggregation level of control channels, the number of repeated transmissions of which is equal to 1, in one subframe; a search space of an aggregation level of control channels, the number of repeated transmissions of which is greater than 1, in one subframe is greater than a search space of a corresponding aggregation level of control channels, the number of repeated transmissions of which is equal to 1, in one subframe.

The aggregation levels and the search spaces of the control channels are the same as the corresponding aggregation levels and search spaces in each of the subframes occupied by the control channels, and the same candidate of the same aggregation level is selected by a terminal in the search space of each of the subframes occupied by the control channels.

In a specific search space of the terminal corresponding to the communication node, a starting position of a control channel element (CCE) in each of the subframes is same, $Y_k$ being 16 or $Y_k=(A \cdot n_{RNTI})$ mod D, wherein $Y_k$ represents a starting position of a specific search space in a subframe with subframe number being k, A represents a constant 39827, $n_{RNTI}$ represents a value of Radio Network Temporary Identity (RNTI), and D represents a constant 65537.

Or in a specific search space of the terminal corresponding to the communication node, a starting position of a CCE in each of the subframes is different according to the frame number of the radio frame and/or the number of repetitions. $Y_k=(A \cdot k \cdot SFN \cdot n_{RNTI})$ mod D, or $Y_k=(A \cdot SFN \cdot Y_{k-1})$ mod D wherein k represents a serial number of an available downlink subframe in the radio frame in which the starting subframe of the control channels is located, and SFN represents a frame number of the radio frame.

The control information carried by the control channels includes simplified resource allocation domain, simplified Modulation and Coding Scheme (MSC) level, the number of simplified Hybrid Automatic Repeat reQuest (HARM) processes, the number of repetitions of traffic channels and repeated subframes occupied by the traffic channels.

The method further comprises determining a timing relationship between the control channels and the traffic channels using one of the following methods after determining the resources for transmitting the control channels according to the predefined information.

Method 1: a starting subframe of the repeated traffic channels is the same as that of the repeated control channels.

Method 2: a starting subframe of the repeated traffic channels is the same as an end subframe of the repeated control channels.

Method 3: a starting subframe of the repeated traffic channels and end subframes of the repeated control channels are separated by r subframes, r≥0.

The method further comprises determining the number of repetitions of the traffic channels after determining the resources for transmitting the control channels according to the predefined information, the number of repetitions of the traffic channels being respectively configured by the terminal according to the traffic channel type.

The number of repetitions of the traffic channels is determined by factors, including channel type, coverage level, predefined period, the number of repeated transmissions of a main information block (MIB), Physical Random Access Channel (PRACH) format and downlink control information indication.

The number of repetitions of the traffic channels carrying the cell specific information is determined according to the number of repeated transmissions of the MIB or the fixed number of repetitions is determined through the predefined period.

The traffic channel type includes a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels.

Or the traffic channel type includes a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels.

Or the traffic channel type includes a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels.

Or the traffic channel type includes a kind of traffic channels scheduled by SI-RNTI-scrambled control channels, and a kind of downlink traffic channels scheduled by P-RNTI, RA-RNTI and C-RNTI-scrambled control channels.

The DCI format corresponding to the downlink control information is DCI format 0 or DCI format 1A when the downlink control information carried by the control channels is UE-specific downlink control information.

The number of candidates of aggregation levels corresponding to the downlink control information carried by the control channels is greater than or equal to the number of candidates of the existing same aggregation levels; or DCI format 0 and DCI format 1A have different sizes.

The present document will be described in further detail in conjunction with the accompanying drawings and specific embodiments. It should be noted that embodiments in the present application and various methods in the embodiments can be combined with each other without conflict.

Embodiment 1

The method for transmitting control channels provided by the present document in Frequency Division Duplexing (FDD) systems is described in detail in this embodiment.

Figure 8:
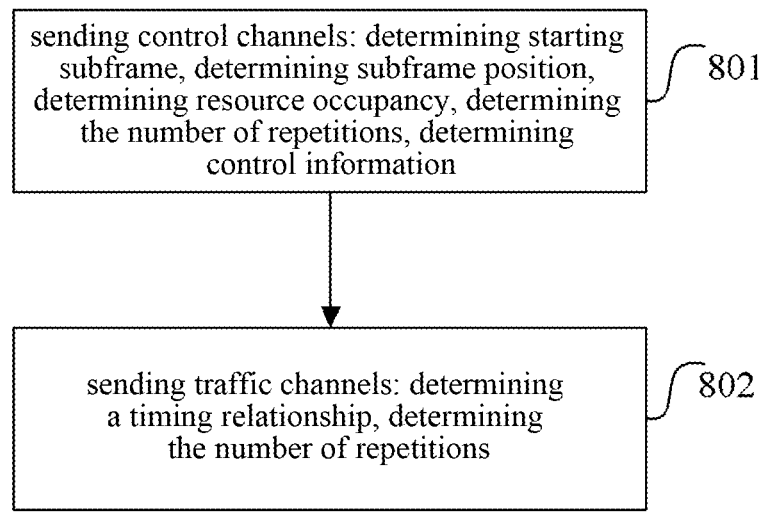
FIG. 8 is a processing flow chart of a method for transmitting control channels at the base station side in accordance with an embodiment of the present document.

Specific processing steps at the base station side is as shown in FIG. 8.

In step 801, a base station sends system messages, while using control channels to schedule and indicate traffic channels, which carries the system messages, to be transmitted. A fixed starting subframe position satisfies a relation (k+h*n)mod N=0, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point all of the subframes may be used by the repeated control channels and be occupied in a successive subframe manner, as shown in FIG. 3. A coverage level of a terminal is determined to be level 2 according to the received random access preamble, the base station selects to transmit DCI information at the aggregation level L of 8 and the number N of repetitions is determined to be 10. Now the repeated N subframes transmit the same DCI information, and each of the subframes selects the second position in a candidate in a common search space of L=8 as resources for transmitting the DCI. The DCI uses format 1A, a resource allocation domain uses 6 bit to indicate the central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and the bits of the final DCI information is filled up to be consistent with format 0 in size. Now CRC information added by the DCI information is scrambled by M-SI-RNTI.

In step 802, when the base station sends the repeated control channels until the last subframe, it begins to send the traffic channels. The timing relationship at this moment is as shown in FIG. 6. The number of repetitions of the traffic channels is determined by the base station according to the coverage level, size of service packets and the scheduled and allocated resources and is indicated by the bit domain in the DCI information.

Figure 9:
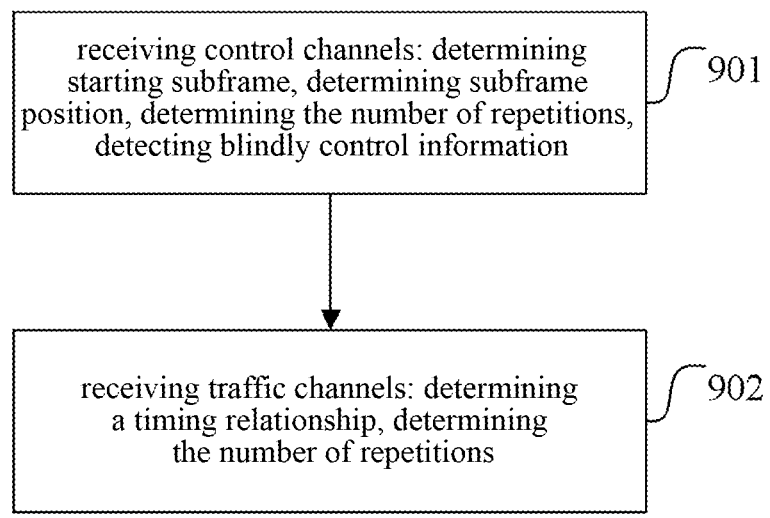
FIG. 9 is a processing flow chart of a method for transmitting control channels at the terminal side in accordance with an embodiment of the present document.

Processing steps at the terminal side is as shown in FIG. 9.

In step 901, the terminal receives the system messages, and it needs to receive first the control channels which schedule and indicate the traffic channels carrying the system messages. The terminal performs detection at a subframe which satisfies a relation (k+h*n)mod N=0 at a fixed starting subframe position, where k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point all of the subframes may be used by the repeated control channels and be received in a successive subframe manner, as shown in FIG. 3. The coverage level is determined to be level 2 by the terminal in the preamble of random access, therefore, the terminal can receive N different subframes of the repeated control channels according to different aggregation levels. For example, when the DCI information is transmitted at the aggregation level L of 8, the number N of repetitions is 10; when the DCI information is transmitted at the aggregation level L of 4, the number N of repetitions is 20. Now the repeated N subframes transmit the same DCI information, and upon blind detection, the received N subframes select the same serial number positions in candidates in a common search space of aggregation level L=4/8 and demodulate the DCI information once. Other positions in the candidate are detected in turn until the correct DCI information is detected. Otherwise, it is believed that the corresponding control information has not been received.

In step 902, the terminal determines the number of repetitions of the corresponding traffic channels and resource occupancy condition according to the detected DCI information. The repeatedly transmitted traffic channels are received, beginning with the last subframe of the repeated control channels, and demodulation is performed using the fixed MCS level until the demodulation is performed once after the reception of the repeated traffic channels is completed, to obtain the system information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 2

The method for transmitting control channels provided by the present document in Frequency Division Duplexing (FDD) systems is described in detail in this embodiment.

Specific processing steps at the base station side is as shown in FIG. 8.

In step 801, a base station sends system messages, while using control channels to schedule and indicate traffic channels, which carries the system messages, to be transmitted. A fixed starting subframe position satisfies a relation Y=(k+h*n1−N+1), and n mod M=m, wherein h is the number of available downlink subframes contained in one radio frame, n1 represents a frame number of the radio frame in which the starting subframe k of the traffic channels carrying the system messages SIB1 is located, n represents a frame number of the radio frame in which the starting subframe Y of the control channels is located, and N represents the number of repetition subframes of the control channels and N≤M*h. Preferably, m=0. Now k=5, M=4, h=10. At this point all of the subframes may be used by the repeated control channels and be occupied in a successive subframe manner, as shown in FIG. 3. The number N of repetitions of a terminal is determined to be 10 according to the received random access preamble, and the base station selects to transmit DCI information at the aggregation level L of 8. Now the repeated N subframes transmit the same DCI information, and each of the subframes selects the second position in a candidate in a common search space of L=8 as resources for transmitting the DCI information. The DCI information uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and the bits of the final DCI information are filled up to be consistent with format 0 in size. Now CRC information added by the DCI information is scrambled by M-SI-RNTI.

In step 802, when the base station sends the repeated control channels until the last subframe, it begins to send the traffic channels. The timing relationship at this moment is as shown in FIG. 6. The number of repetitions of the traffic channels is determined by the base station according to the coverage level, size of service packets and the scheduled and allocated resources and is indicated by the bit domain in the DCI information.

Processing steps at the terminal side is as shown in FIG. 9.

In step 901, the terminal receives the system messages, and it needs to receive first the control channels which schedule and indicate the traffic channels carrying the system messages. The terminal satisfies a relation Y=(k+h*n1−N+1) and n mod M=m at a fixed starting subframe position, where h is the number of available downlink subframes contained in one radio frame, n1 represents a frame number of the radio frame in which the starting subframe k of the traffic channels carrying the system messages SIB1 is located, n represents a frame number of the radio frame in which the starting subframe Y of the control channels is located, and N represents the number of repetition subframe of the control channels and N≤M*h. Preferably, m=0. Now k=5, M=4, h=10. At this point all of the subframes may be used by the repeated control channels and be received in a successive subframe manner, as shown in FIG. 3. The number N of repetitions is determined to be 10 by the terminal in the preamble of random access, therefore, the terminal can receive N subframes of the repeated control channels according to different aggregation levels. Now the repeated N subframes transmit the same DCI information, and upon blind detection, the received N subframes select the same serial number positions in candidates in a common search space of aggregation level L=4/8 and demodulate the DCI information once. Other positions in the candidate are detected in turn until the correct DCI information is detected. Otherwise, it is believed that the corresponding control information has not been received.

In step 902, the terminal determines the number of repetitions of the corresponding traffic channels and resource occupancy condition according to the detected DCI information. The repeatedly transmitted traffic channels are received, beginning with the last subframe of the repeated control channels, and demodulation is performed using the fixed MCS level until the demodulation is performed once after the reception of the repeated traffic channels is completed, to obtain the system information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 3

The method for transmitting control channels provided by the present document in Frequency Division Duplexing (FDD) systems is described in detail in this embodiment.

Specific processing steps at the base station side is as shown in FIG. 8.

In step 801, a base station sends UE specific messages, while using control channels to schedule and indicate traffic channels, which carries the system messages, to be transmitted. A fixed starting subframe position satisfies a relation (k+h*n) mod N=m, wherein k represents the starting subframe, 0≤k≤h−1, n represents a radio frame in which starting subframe k is located, N represents the number of repetitions of transmitting the control channels, and m is a subset of a set {0, 1, . . . , N−1}. Now the value of m is a value in {0, N/2}. At this point all of the subframes may be used by the repeated control channels and be occupied in a successive subframe manner, as shown in FIG. 3. The coverage level of a terminal is determined to be level 3 according to the received random access preamble, the base station selects to transmit DCI information at the aggregation level L of 8, and determines the number N of repetitions to be 30. Now the repeated N subframes transmit the same DCI information, and each of the subframes selects the third position in a candidate in an expanded UE-specific search space of L=8 as resources for transmitting the DCI information. In the expanded UE-specific search space, the starting position of the CCE is different in each subframe, $Y_k=(A \cdot k \cdot SFN \cdot n_{RNTI})\mod D$ or $Y_k=(A \cdot SFN \cdot Y_{k-1})\mod D$. Now the DCI uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and repeated subframe occupancy bit domain 10 bit is added. Bit 1001111111 represents subframes 0, 3, 4, 5, 6, 7, 8, 9 in one radio frame which can be occupied repeatedly by traffic channels. The bits of the final DCI information are filled up to be consistent with format 0 in size.

In step 802, after the base station has sent the repeated control channels, it begins to send the traffic channels, beginning with the next subframe after the transmission of the control channels is finished. The timing relationship at this moment is as shown in FIG. 7. The number of repetitions of the traffic channels is determined by the base station according to the coverage level, size of service packets and the scheduled and allocated resources and is indicated by the bit domain in the DCI. The repeated subframe occupancy of the traffic channels is indicated by the bit domain in the DCI.

Processing steps at the terminal side is as shown in FIG. 9.

In step 901, the terminal receives its specific messages, and it needs to receive first the control channels which schedule and indicate the traffic channels carrying the specific messages. The terminal satisfies a relation (k+h*n) mod N=m at a fixed starting subframe position, wherein k represents the starting subframe, 0≤k≤h−1, n represents a radio frame in which the starting subframe k is located, N represents the number of repetitions of transmitting the control channels, and m is a subset of a set {0, 1, . . . , N−1}. Now the value of m is a value in the set {0, N/2}. At this point all of the subframes may be used by the repeated control channels and be received in a successive subframe manner, as shown in FIG. 3. The coverage level is determined to be level 3 by the terminal in the preamble of random access, therefore, the terminal can receive N different subframes of the repeated control channels according to different aggregation levels. For example, when the DCI information is transmitted at the aggregation level L of 8, the number N of repetitions is 30; when the DCI information is transmitted at the aggregation level L of 4, the number N of repetitions is 60. Now the repeated N subframes transmit the same DCI information, and upon blind detection, the received N subframes select the same serial number positions in candidates in the expanded specific search space of aggregation level L=4/8 and demodulate the DCI information once. In the expanded UE-specific search space, the starting position of the CCE is different in each subframe, $Y_k=(A \cdot k \cdot SFN \cdot n_{RNTI})\mod D$ or $Y_k=(A \cdot SFN \cdot Y_{k-1})\mod D$. Other positions in the candidate are detected in turn until the correct DCI information is detected. Otherwise, it is believed that the corresponding control information has not been received.

In step 902, the terminal determines the number of repetitions of the corresponding traffic channels, resource occupancy condition and available repeated subframes according to the detected DCI information. The repeatedly transmitted traffic channels are received, beginning with the first subframe after the repeated control channels are completed, and demodulation is performed using the fixed MCS level until the demodulation is performed once after the reception of the repeated traffic channels is completed, to obtain the specific information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 4

The method for transmitting control channels provided by the present document in Frequency Division Duplexing (FDD) systems is described in detail in this embodiment.

Specific processing steps at the base station side is as shown in FIG. 8.

In step 801, a base station sends random access response messages, while using control channels to schedule and indicate traffic channels, which carries the random access response messages, to be transmitted. A starting subframe position indicates the number N of repetitions of the repeatedly transmitted control channels by the newly added bit domain of a broadcast channel, and the starting frame is subframe 0 in a radio frame after the reception and processing of the random access messages are completed. At this point all of the subframes may be used by the repeated control channels and be occupied in a successive subframe manner, and the system configured MBSFN subframes are skipped automatically. The coverage level of a terminal is determined to be level 2 according to the received random access preamble, and the base station selects to transmit DCI information at the aggregation level L of 8, and determines the number N of repetitions to be 10. Now the repeated N subframes transmit the same DCI information, and each of the subframes selects the fourth position in a candidate in an expanded common search space of L=8 as resources for transmitting the DCI information. Now the DCI information uses format 1C, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and the bits of the final DCI information are filled up to be consistent with format 1C in size. Now CRC information added by the DCI information is scrambled by M-RA-RNTI.

In step 802, when the base station sends the repeated control channels until the last subframe, it begins to send the traffic channels. The timing relationship at this moment is as shown in FIG. 6. The number of repetitions of the traffic channels is determined by the base station according to the coverage level, size of service packets and the scheduled and allocated resources and is indicated by the bit domain in the DCI.

Processing steps at the terminal side is as shown in FIG. 9.

In step 901, the terminal receives the random access response messages, and it needs to receive first the control channels which schedule and indicate the traffic channels carrying the random access response messages. The terminal indicates the number N of repetitions of the repeatedly transmitted control channels by the newly added bit domain of the broadcast channel, and the terminal will detect blindly control information after receiving the N subframes by taking subframe 0 in each radio frame after the random accesses have been sent as the starting frame of the control channels. At this point all of the subframes may be used by the repeated control channels and be received in a successive subframe manner, and the system configured MBSFN subframes are skipped automatically. The coverage level is determined to be level 2 by the terminal in the preamble of random access, therefore, the terminal can receive N different subframes of the repeated control channels according to different aggregation levels. For example, when the DCI information is transmitted at the aggregation level L of 8, the number N of repetitions is 10; when the DCI information is transmitted at the aggregation level L of 4, the number N of repetitions is 20. Now the repeated N subframes transmit the same DCI information, and upon blind detection, the received N subframes select the same serial number positions in candidates in an expanded common search space of aggregation level L=4/8 and demodulate the DCI information once. Other positions in the candidate are detected in turn until the correct DCI information is detected. Otherwise, it is believed that the corresponding control information has not been received.

In step 902, the terminal determines the number of repetitions of the corresponding traffic channels and resource occupancy condition according to the detected DCI information. The repeatedly transmitted traffic channels are received, beginning with the last subframe of the repeated control channels, and demodulation is performed using the fixed MCS level until the demodulation is performed once after the reception of the repeated traffic channels is completed, to obtain the random access response messages carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 5

The method for transmitting control channels provided by the present document in Frequency Division Duplexing (FDD) systems is described in detail in this embodiment.

Specific processing steps at the base station side is as shown in FIG. 8.

In step 801, a base station sends UE-specific messages, while using control channels to schedule and indicate traffic channels, which carries the specific messages, to be transmitted. A fixed starting subframe position satisfies a relation (k+h*n)mod N=0, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of the control channels. Now h=10, k=0. At this point the subframes are occupied in a T=10 spaced subframe manner, as shown in FIG. 4. A coverage level of a terminal is determined to be level 4 according to the received random access preamble, and the base station selects to transmit DCI information at the aggregation level L of 8 and determines the number N of repetitions to be 100. Now the repeated N subframes transmit the same DCI information, and each of the subframes selects the third position in a candidate in an expanded UE-specific search space of L=8 as resources for transmitting the DCI. In the expanded UE-specific search space, the starting position of the CCE is different in each subframe, $Y_k=(A \cdot k \cdot SFN \cdot n_{RNTI})\mod D$ or $Y_k=(A \cdot SFN \cdot Y_{k-1}) \mod D$. Now the DCI information uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and repeated subframe occupancy bit domain 10 bit is added. Bit 1001111111 represents subframes 0, 3, 4, 5, 6, 7, 8, 9 in one radio frame which can be occupied repeatedly by traffic channels. The bits of the final DCI information are filled up to be consistent with format 0 in size.

In step 802, after the base station has sent the repeated control channels, it begins to send the traffic channels beginning with the next subframe after the transmission of the control channels is finished. The timing relationship at this moment is as shown in FIG. 7. The number of repetitions of the traffic channels is determined by the base station according to the coverage level, size of service packets and the scheduled and allocated resources and is indicated by the bit domain in the DCI. The repeated subframe occupancy of the traffic channels is indicated by the bit domain in the DCI.

Processing steps at the terminal side is as shown in FIG. 9.

In step 901, the terminal receives its specific messages, and it needs to receive first the control channels which schedule and indicate the traffic channels carrying the specific messages. The terminal satisfies a relation (k+h*n)mod N=0 at a fixed starting subframe position, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point the subframes are received in the T=10 spaced subframe manner, as shown in FIG. 4. A coverage level of a terminal is determined to be level 4 in the preamble of random access, therefore, the terminal can receive N different subframes of the repeated control channels according to different aggregation levels. For example, when the DCI information is transmitted at the aggregation level L of 8, the number N of repetitions is 100; when the DCI information is transmitted at the aggregation level L of 4, the number N of repetitions is 200. Now the repeated N subframes transmit the same DCI information, and upon blind detection, the received N subframes select the same serial number positions in candidates in an expanded specific search space of aggregation level L=4/8 and demodulate the DCI information once. In the expanded UE-specific search space, the starting position of the CCE is different in each subframe, $Y_k=(A \cdot k \cdot SFN \cdot n_{RNTI})\mod D$ or $Y_k=(A \cdot SFN \cdot Y_{k-1})\mod D$. Other positions in the candidate are detected in turn until the correct DCI information is detected. Otherwise, it is believed that the corresponding control information has not been received.

In step 902, the terminal determines the number of repetitions of the corresponding traffic channels, resource occupancy condition and available repeated subframes according to the detected DCI information. The repeatedly transmitted traffic channels are received, beginning with the first subframe after the repeated control channels are completed, and demodulation is performed using the fixed MCS level until the demodulation is performed once after the reception of the repeated traffic channels is completed, to obtain the specific information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 6

The method for transmitting control channels provided by the present document in Time Division Duplexing (TDD) systems is described in detail in this embodiment.

Specific processing steps at the base station side is as shown in FIG. 8.

In step 801, a base station sends UE-specific messages, while using control channels to schedule and indicate traffic channels, which carries the specific messages, to be transmitted. A fixed starting subframe position satisfies a relation (k+h*n) mod N=0, wherein k represents a serial number of an available downlink subframe in a radio frame in which the starting subframe is located, in TDD, it is renumbered in an order according to the available downlink subframes in the radio frame, 0≤k≤h−1, n represents the radio frame in which the starting subframe k is located, h is the number of available downlink subframes contained in one radio frame, and N represents the number of repeated transmissions of the control channels. Now uplink and downlink subframe configuration 1 of TDD is configured by the base station, h=6, and k=0. At this point all of the h downlink subframes (including special subframes) are used by the repeated control channels and occupied in a successive subframe manner after the downlink subframes is renumbered. A coverage level of a terminal is determined to be level 2 according to the received random access preamble, and the base station selects to transmit DCI information at the aggregation level L of 8 and determines the number N of repetitions to be 10. Now the repeated N subframes transmit the same DCI information, and each of the subframes selects the first position in a candidate in a UE-specific search space of L=8 as resources for transmitting the DCI information. Now the DCI uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}, and repeated subframe occupancy bit domain 10 bit is added. Bit 1001111111 represents subframes 0, 1, 4, 5, 6, 9 in one radio frame which can be occupied repeatedly by traffic channels. The bits of the final DCI information are filled up to be consistent with format 0 in size.

In step 802, after the base station has sent the repeated control channels, it begins to send the traffic channels, beginning with the next subframe after the transmission of the control channels is finished. The number of repetitions of the traffic channels is determined by the base station according to the coverage level, size of service packets and the scheduled and allocated resources and is indicated by the bit domain in the DCI. The repeated subframe occupancy of the traffic channels is indicated by the bit domain in the DCI information.

Processing steps at the terminal side is as shown in FIG. 9.

In step 901, the terminal receives its specific messages, and it needs to receive first the control channels which schedule and indicate the traffic channels carrying the specific messages. The terminal satisfies a relation (k+h*n)mod N=0 at a fixed starting subframe position, wherein k represents a serial number of an available downlink subframe in a radio frame in which the starting subframe is located, in TDD, it is renumbered in an order according to the available downlink subframes in the radio frame, 0≤k≤h−1, n represents the radio frame in which the starting subframe k is located, h is the number of available downlink subframes contained in one radio frame, and N represents the number of repeated transmissions of the control channels. Now configured uplink and downlink subframe configuration 1 of TDD is obtained by the terminal, h=6, and k=0. At this point all of the h downlink subframes (including special subframes) are used by the repeated control channels and received in a successive subframe manner. A coverage level is determined to be level 2 by the terminal in the preamble of random access, therefore, the terminal can receive N different subframes of the repeated control channels according to different aggregation levels. For example, when the DCI information is transmitted at the aggregation level L of 8, the number N of repetitions is 10; when the DCI information is transmitted at the aggregation level L of 4, the number N of repetitions is 20, and the aggregation levels L of 1 and 2 are not detected. Now the repeated N subframes transmit the same DCI information, and upon blind detection, the received N subframes select the same serial number positions in candidates in a specific search space of aggregation level L=4/8 and demodulate the DCI information once. Other positions in the candidate are detected in turn until the correct DCI information is detected. Otherwise, it is believed that the corresponding control information has not been received.

In step 902, the terminal determines the number of repetitions of the corresponding traffic channels, resource occupancy condition and available repeated subframes according to the detected DCI information. The repeatedly transmitted traffic channels are received, beginning with the first downlink subframe after the repeated control channels are completed, and demodulation is performed using the fixed MCS level until the demodulation is performed once after the reception of the repeated traffic channels is completed, to obtain the specific information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 7

The method for transmitting control channels provided by the present document in Time Division Duplexing (TDD) systems is described in detail in this embodiment.

Specific processing steps at the base station side is as shown in FIG. 8.

In step 801, a base station sends UE-specific messages, while using control channels to schedule and indicate traffic channels, which carries the specific messages, to be transmitted. A fixed starting subframe position satisfies a relation (k+h*n) mod N=0, wherein k represents a serial number of an available downlink subframe in a radio frame in which the starting subframe is located, in TDD, it is renumbered in an order according to the available downlink subframes in the radio frame, 0≤k≤h−1, n represents the radio frame in which the starting subframe k is located, h is the number of available downlink subframes contained in one radio frame, and N represents the number of repeated transmissions of the control channels. Now uplink and downlink subframe configuration 4 of TDD is configured by the base station, h=7, and k=0. At this point all of the h downlink subframes (including special subframes) are used by the repeated control channels and occupied in a T=10 spaced subframe manner, and only the downlink subframes is used excluding the special subframes. The number of repetitions of a terminal is determined to be 10 according to the received preamble of random access. Now the repeated N subframes transmit the same DCI information, and each of the subframes selects the first position in a candidate in a UE-specific search space of L=8 as resources for transmitting the DCI information. Now the DCI uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}. The bits of the final DCI information are filled up to be consistent with format 0 in size.

In step 802, after the base station has sent the repeated control channels, it begins to send the traffic channels, beginning with the next subframe after the transmission of the control channels is finished. The number of repetitions of the traffic channels is determined by the base station according to the coverage level, size of service packets and the scheduled and allocated resources and is indicated by the bit domain in the DCI. The repeated subframe occupancy of the traffic channels is indicated by the bit domain in the DCI.

Processing steps at the terminal side is as shown in FIG. 9.

In step 901, the terminal receives its specific messages, and it needs to receive first the control channels which schedule and indicate the traffic channels carrying the specific messages. The terminal satisfies a relation (k+h*n)mod N=0 at a fixed starting subframe position, wherein k represents a serial number of an available downlink subframe in a radio frame in which the starting subframe is located, in TDD, it is renumbered in an order according to the available downlink subframes in the radio frame, 0≤k≤h−1, n represents the radio frame in which the starting subframe k is located, h is the number of available downlink subframes contained in one radio frame, and N represents the number of repeated transmissions of the control channels. Now the configured uplink and downlink subframe configuration 4 of TDD is obtained by the terminal, h=7, and k=0. At this point all of the h downlink subframes (including special subframes) are used by the repeated control channels and received in a T=10 spaced subframe manner. The number of repetitions is determined to be 10 by the terminal in the preamble of random access without detecting aggregation levels L of 1 and 2. Now the repeated N subframes transmit the same DCI information, and upon blind detection, the received N subframes select the same serial number positions in candidates in a specific search space of aggregation level L=4/8 and demodulate the DCI information once. Other positions in the candidate are detected in turn until the correct DCI information is detected. Otherwise, it is believed that the corresponding control information has not been received.

In step 902, the terminal determines the number of repetitions of the corresponding traffic channels, resource occupancy condition and available repeated subframes according to the detected DCI information. The repeatedly transmitted traffic channels are received, beginning with the first downlink subframe after the repeated control channels are completed, and demodulation is performed using the fixed MCS level until the demodulation is performed once after the reception of the repeated traffic channels is completed, to obtain the specific information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 8

The method for transmitting control channels provided by the present document in Frequency Division Duplexing (FDD) systems is described in detail in this embodiment.

Figure 10:
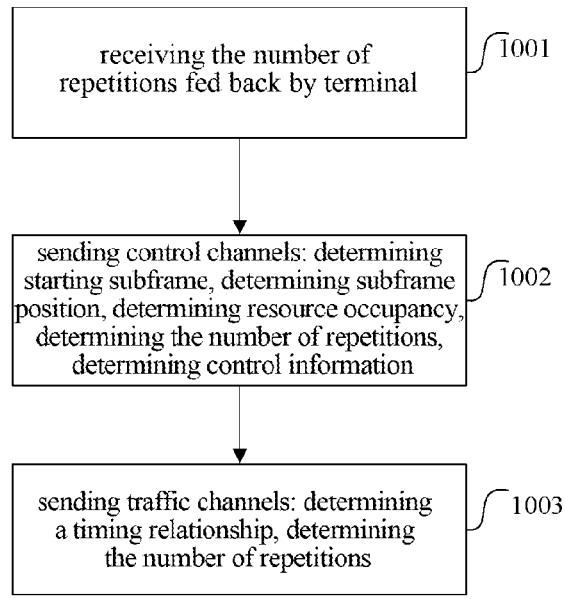
FIG. 10 is a processing flow chart of a method for transmitting control channels at the base station side in accordance with an embodiment of the present document.

Specific processing steps at the base station side is as shown in FIG. 10.

In step 1001, a base station receives the number of repetitions of the control channels fed back from a terminal, and an aggregation level L is 8 by default and is used when the control channels are sent to the terminal.

In step 1002, the base station sends UE-specific messages, while using control channels to schedule and indicate traffic channels, which carries the specific messages, to be transmitted. A fixed starting subframe position satisfies a relation (k+h*n)mod N=0, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point the subframes are occupied in a successive subframe manner, as shown in FIG. 3. The number N of repetitions is determined to be 100 according to repetition information of the control channels fed back by the terminal. Now the repeated N subframes transmit the same DCI information, and each of the subframes selects the third position in a candidate in an expanded UE-specific search space of L=8 as resources for transmitting the DCI. In the expanded UE-specific search space, the starting position of the CCE is different in each subframe, $Y_k=(A·k·SFN·n_{RNTI})$ mod D or $Y_k=(A·SFN·Y_{k-1})$mod D. Now the DCI uses format 1A, a resource allocation domain uses 6 bit to indicate central 1.4 MHz bandwidth for resource allocation calculation without MCS level bit domain and HARQ process bit domain. The number of repetitions bit domain 3 bit of the traffic channels is added to indicate one value in a set {4, 10, 20, 50, 100, 200, 300, 400}. The bits of the final DCI information are filled up to be consistent with format 0 in size. Now the traffic channels are occupied in the successive subframe manner by default and special subframes such as the system configured MBSFN and ABS are skipped by default.

In step 1003, after the base station has sent the repeated control channels, it begins to send the traffic channels, beginning with the next subframe after the transmission of the control channels is finished. The timing relationship at this moment is as shown in FIG. 7. The number of repetitions of the traffic channels is determined by the base station according to the coverage level, size of service packets and the scheduled and allocated resources and is indicated by the bit domain in the DCI. The repeated subframe occupancy of the traffic channels is indicated by the bit domain in the DCI.

Figure 11:
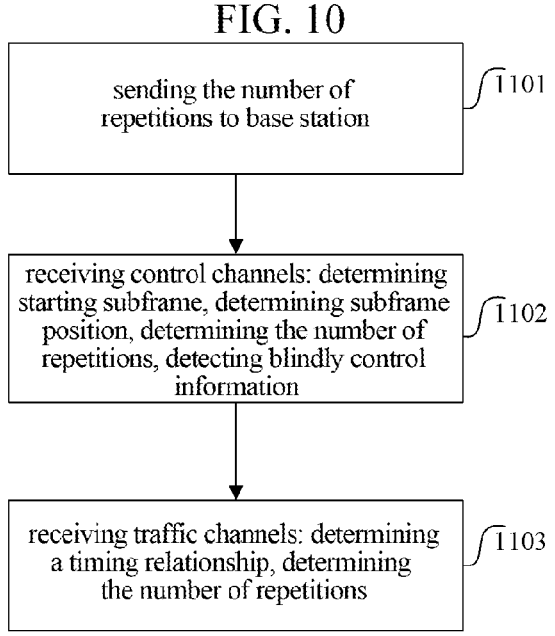
FIG. 11 is a processing flow chart of a method for transmitting control channels at the terminal side in accordance with an embodiment of the present document.

Processing steps at the terminal side is as shown in FIG. 11.

In step 1101, the terminal sends the number of repetitions of the control channels to the base station to be used by the corresponding base station when sending the control channels to the terminal.

In step 1102, the terminal receives its specific messages, and it needs to receive first the control channels which schedule and indicate the traffic channels carrying the specific messages. The terminal satisfies a relation (k+h*n)mod N=0 at a fixed starting subframe position, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point the subframes are received in a successive subframe manner, as shown in FIG. 3. N=100 subframes of the repeated control channels are received by the terminal according to the aggregation level L=8. Now the repeated N subframes transmit the same DCI information, and upon blind detection, the received N subframes select the same serial number positions in candidates in an expanded specific search space of aggregation level L=8 and demodulate the DCI information once. In the expanded UE-specific search space, the starting position of the CCE is different in each subframe, $Y_k=(A·k·SFN·n_{RNTI})$ mod D or $Y_k=(A·SFN·Y_{k-1})$mod D. Other positions in the candidate are detected in turn until the correct DCI information is detected. Otherwise, it is believed that the corresponding control information has not been received.

In step 1103, the terminal determines the number of repetitions of the corresponding traffic channels and resource occupancy condition according to the detected DCI information. The repeatedly transmitted traffic channels are received, beginning with the first subframe after the repeated control channels are completed, and special subframes such as the system configured MBSFN and ABS are skipped by default. Demodulation is performed using the fixed MCS level until the demodulation is performed once after the reception of the repeated traffic channels is completed, to obtain the specific information carried by the channels.

This embodiment, when being implemented, can flexibly configure the sent resources of the control channels and traffic channels and ensure the normal communication between the terminal with different coverage enhancement levels and the base station by repeated transmissions of the control channels.

Embodiment 9

The method for transmitting control channels provided by the present document in Frequency Division Duplexing (FDD) systems is described in detail in this embodiment.

Specific processing steps at the base station side is as shown in FIG. 8.

In step 801, a base station sends system messages, while using control channels to schedule and indicate traffic channels, which carries the system messages, to be transmitted. A fixed starting subframe position satisfies a relation (k+h*n)mod N=0, wherein k represents a serial number of an available downlink subframe in a radio frame in which the starting subframe is located, 0≤k≤h−1, n represents the radio frame in which the starting subframe k is located, h is the number of available downlink subframes contained in one radio frame, and N represents the number of repetitions of transmitting the control channels. Now h=10, k=0. At this point all of the subframes may be used by the repeated control channels and be occupied in a successive subframe manner, as shown in FIG. 3. A coverage level of a terminal is determined to be increased by 15 dB (level 3) according to the received random access preamble, and the base station selects to transmit DCI information at the aggregation level L of 8 and determines the number N of repetitions to be 20. Now the repeated N subframes transmit the same DCI information, and each of the subframes selects the second position in a candidate in a common search space of L=8 as resources for transmitting the DCI. Now the DCI information uses format 1A, a resource allocation domain uses 6 bit to indicate central 1.4 MHz bandwidth for resource allocation calculation without using MCS bit domain, and the bits of the final DCI information are filled up to be consistent with format 0 in size. Now CRC information added by the DCI information is scrambled by M-SI-RNTI.

In step 802, when the base station sends the repeated control channels until the last subframe, it begins to send the traffic channels. The timing relationship at this moment is as shown in FIG. 6. The number of repetitions of the traffic channels is determined to be 50 by the base station according to the coverage level which is increased by 15 dB (level 3).

Processing steps at the terminal side is as shown in FIG. 9.

In step 901, the terminal receives the system messages, and it needs to receive first the control channels which schedule and indicate the traffic channels carrying the system messages. The terminal satisfies a relation $(k+h*n) \bmod N=0$ at a fixed starting subframe position and performs detection, wherein k represents a serial number of an available downlink subframe in a radio frame in which the starting subframe is located, $0 \leq k \leq h-1$, n represents the radio frame in which the starting subframe k is located, h is the number of available downlink subframes contained in one radio frame, and N represents the number of repetitions of transmitting the control channels. Now h=10, k=0. At this point all of the subframes may be used by the repeated control channels and be received in a successive subframe manner, as shown in FIG. 3. The coverage level is determined to be increased by 15 dB (level 3) by the terminal in the preamble of random access, therefore, the terminal can receive N different subframes of the repeated control channels according to different aggregation levels. For example, when the DCI information is transmitted at the aggregation level L of 8, the number N of repetitions is 20; when the DCI information is transmitted at the aggregation level L of 4, the number N of repetitions is 40. Now the repeated N subframes transmit the same DCI information, and upon blind detection, the received N subframes select the same serial number position in a candidate in a common search space of aggregation level L=4/8 and demodulate the DCI information once. Other positions in the candidate are detected in turn until the correct DCI information is detected. Otherwise, it is believed that the corresponding control information has not been received.

In step 902, the terminal determines resource occupancy condition of traffic channels according to the detected DCI information. The number of repetitions is determined to be 50 according to the coverage level which is increased by 15 dB (level 3). The repeatedly transmitted traffic channels are received, beginning with the last subframe of the repeated control channels, and demodulation is performed using the fixed MCS level until the demodulation is performed once after the reception of the repeated traffic channels is completed, to obtain the system information carried by the channels.

This embodiment, when being implemented, can flexibly configure the sent resources of the control channels and traffic channels, and the fixed number of repetitions is simple to implement, thereby ensuring normal communication between the terminal with different coverage enhancement levels and the base station by repeated transmissions of the control channels.

It can be seen from the embodiments described above, the method for transmitting control channels provided by the present document can enhance the reliability of the transmission of the control channel in LTE systems and improve the coverage capability of terminal devices under environments with coverage enhancement requirements to ensure normal communication of the terminal devices.

Figure 14:
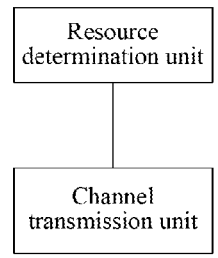
FIG. 14 is a structural diagram of a communication node in accordance with an embodiment of the present document.

As shown in FIG. 14, the present application further provides a communication node comprising a resource determination unit and a channel transmission unit.

The resources determination unit is configured to determine resources for transmitting control channels according to predefined information, the predefined information including at least one of the following information: the number of repetitions of the control channels, control channel type, traffic channel type and traffic channel starting position.

The channel transmission unit is configured to transmit repeatedly the control channels multiple times on the resources for transmitting the control channels determined by the resource determination unit.

The resources for transmitting the control channels are at least located in two or more than two subframes or in one subframe where the number of Orthogonal Frequency Division Multiplexing (OFDM) symbols occupied by the control channels is greater than 3.

The number of repetitions of the control channels is determined by factors, including one or more of coverage level, preamble of random access, random access response message, conflict resolution message, aggregation level, control information DCI format, control information type, system information and physical broadcast channel (PBCH) information or further including the number of repetitions of the control channels fed back by a terminal corresponding to the communication node, and the PBCH information including the number of repetitions of the PBCH and/or signaling carried by the PBCH, and the control information type including cell specific information and user-specific information.

The resources determination unit is further configured to determine resources for transmitting control channels according to predefined information, comprising: configuring respectively a starting subframe of control channels scheduling new transmission service messages and a starting subframe of control channels scheduling retransmission service messages according to the control channel type or configuring independently a starting subframe of control channels scheduling the cell specific information and a starting subframe of control channels scheduling the specific information according to the control channel type.

The resource determination unit is configured to configure the starting subframe of the control channels using one of the following methods:

Method 1: the starting subframe of the control channels is determined according to a relation $(k+h*n) \bmod N=0$, wherein k represents a serial number of an available downlink subframe in a radio frame in which the starting subframe of the control channels is located, $0 \leq k \leq h-1$, n represents a frame number of the radio frame in which the starting subframe of the control channels is located, h is the number of available downlink subframes contained in one radio frame, and N represents the number of repetitions of the control channels.

Method 2: the starting subframe of the control channels is determined according to a relation (k+h*n)mod M=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, . . . , (M/N−1)*N}.

Method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, . . . , M/h}.

Method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

Other functions of various modules of the communication node in accordance with the present application are similar to the description of the method for transmitting control channels described above and will not be repeated herein any more.

Figure 15:
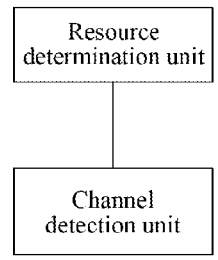
FIG. 15 is a structural diagram of a terminal in accordance with an embodiment of the present document.

As shown in FIG. 15, the present application further provides a terminal comprising a resource determination unit and a channel detection unit.

The resources determination unit is configured to determine resources for transmitting control channels according to predefined information, the predefined information including at least one of the following information: the number of repetitions of the control channels, control channel type, traffic channel type and traffic channel starting position.

The channel detection unit is configured to detect repeatedly the control channels multiple times on the resources for transmitting the control channels determined by the resource determination unit.

The resources for transmitting the control channels are at least located in two or more than two subframes or in one subframe where the number of Orthogonal Frequency Division Multiplexing (OFDM) symbols occupied by the control channels is greater than 3.

The number of repetitions of the control channels is determined by factors, including one or more of coverage level, preamble of random access, random access response message, conflict resolution message, aggregation level, control information DCI format, control information type, system information and physical broadcast channel (PBCH) information, the PBCH information including the number of repetitions of the PBCH and/or signaling carried by the PBCH, and the control information type including cell specific information and UE specific information.

The resources determination unit is further configured to determine resources for transmitting control channels according to predefined information, comprising: configuring respectively a starting subframe of control channels scheduling new transmission service messages and a starting subframe of control channels scheduling retransmission service messages according to the control channel type or configuring independently a starting subframe of control channels scheduling the cell specific information and a starting subframe of control channels scheduling the specific information according to the control channel type.

The resource determination unit is configured to configure the starting subframe of the control channels using one of the following methods:

Method 1: the starting subframe of the control channels is determined according to a relation (k+h*n)mod N=0, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, and N represents the number of repetitions of the control channels.

Method 2: the starting subframe of the control channels is determined according to a relation (k+h*n)mod M=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, . . . , (M/N−1)*N}.

Method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of the starting subframe of traffic channels, n1 represents a frame number of the radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, . . . , M/h}.

Method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

Other functions of various modules of the terminal in accordance with the present application are similar to the description of the method for transmitting control channels described above and will not be repeated herein any more.

All above is to describe the embodiments of the present document only and not to limit the present document, and various alterations and changes can be made to the present document by those skilled in the art. Any modification, equivalent substitution and improvement made within the spirit and principle of the present document should be included in the scope of the claims of the present document.

INDUSTRIAL APPLICABILITY

Embodiments of the present document solve the technical problem of repeated transmissions of downlink control channels being unable to be performed in LTE systems, and therefore implement repeated transmissions of the control channels at the network side in the presence of coverage enhancement requirements so as to ensure that a terminal having the coverage enhancement requirements can receive correctly control information sent by a base station, further ensuring the corresponding data transmission.

What is claimed is:

1. A method for transmitting control channels comprising:
a communication node determining resources for transmitting control channels according to predefined information and transmitting repeatedly the control channels multiple times on the determined resources for transmitting the control channels, the predefined information including at least one of following information: the number of repetitions of the control channels, control channel type, traffic channel type and traffic channel starting position;
wherein the determining resources for transmitting the control channels according to predefined information comprises:
the communication node configuring independently a starting subframe of control channels scheduling cell specific information and a starting subframe of control channels scheduling specific information according to the control channel type;
wherein the starting subframe of the control channels is configured using one of following methods:
method 1: the starting subframe of the control channels is determined according to a relation (k+h*n)mod N=0, wherein k represents a serial number of an available downlink subframe in a radio frame in which the starting subframe of the control channels is located, 0<k<h−1, n represents a frame number of the radio frame in which the starting subframe of the control channels is located, h is the number of available downlink subframes contained in one radio frame, and N represents the number of repetitions of the control channels;
method 2: the starting subframe of the control channels is determined according to a relation (k+h*n)mod M=m, wherein k represents a serial number of an available downlink subframe in a radio frame in which the starting subframe of the control channels is located, 0<k<h−1, n represents a frame number of the radio frame in which the starting subframe of the control channels is located, h is the number of available downlink subframes contained in one radio frame, M is a period, N represents the number of repetitions of the control channels, N≤M, and m is a subset of a set {0, N, 2*N, . . . , (M/N−1)*N};
method 3: the starting subframe of the control channels is determined according to a relation k=(Y+h*n1−N+1) or k=(Y+h*n1−N) and n mod M=m, wherein k represents a serial number of an available downlink subframe in a radio frame in which the starting subframe of the control channels is located, Y represents a frame number of starting subframe of traffic channels, n1 represents a frame number of a radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1,2 . . . , M/h}; and
method 4: the starting subframe of the control channels is determined according to a relation (k+h*n)mod N=m, wherein k represents a serial number of an available downlink subframe in a radio frame in which the starting subframe of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

2. The method according to claim 1, wherein
the resources for transmitting the control channels are at least located in two or more than two subframes or in one subframes where ihe number of Orthogonal Frequency Division Multiplexing (OFDM) symbols occupied by the control channels is greater than 3; or
the number of repetitions of the control channels is determined by factors, including one or more of coverage level, preamble of random access, random access response message, conflict resolution message, aggregation level, control information DCI format, control information type, system information and physical broadcast channel (PBCH) information or further including the number of repetitions of the control channels fed back by a terminal corresponding to the communication node, the PBCH information including the number of repetitions of the PBCH and/or signaling carried by the PBCH, and the control information type including cell specific information and UE specific information.

3. The method according to claim 1, further comprising:
the communication node, before transmitting the control channels, sending one or more of the number N of repetitions of the control channels, the period M and m to a terminal corresponding to the communication node by a newly added hit domain of a broadcast channel to instruct the terminal to determine the resources for transmitting the control channels; or
wherein the determining resources for transmitting the control channels according to predefined information further comprises determining positions of subframes of the control channels using one of following methods after determining the starting subframes of the control channels, comprising:
method 1: N subframes transmitted repeatedly N times are occupied successively in a successive occupancy manner; and method 2: N subframes transmitted repeatedly N times are occupied in a T uniformly-spaced subframe occupancy manner.

4. The method according to claim 1, wherein after determining the resources for transmitting the control channels, the method further comprises the communication node determining aggregation levels and search spaces of the control channels according to the number of repetitions of the control channels, the aggregation levels and the search spaces of the control channels are the same as corresponding aggregation levels and search spaces in each of subframes occupied by the control channels, and the same candidate of the same aggregation level is selected by the communication node in the search space of each of the subframes occupied by the control channels; or in a specific search space of a terminal corresponding to the communication node, a starting position of a control channel element (CCE) in each of subframes is same, $Y_k$ is 16 or $Y_k=(A \cdot n_{RNTI})\bmod D$, wherein $Y_k$ represents a starting position of a specific search space in a subframe with subframe number being k, A represents a constant 39827, $n_{RNTI}$ represents a value of Radio Network Temporary Identity (RNTI), and D represents a constant 65537; or in a specific search space of the terminal corresponding to the communication node, a starting position of a CCE in each of the subframes is different according to a frame number of the radio frame and/or the number of repetitions.

5. The method according to claim 1, further comprising: determining control information carried by the control channels after determining the resources for transmitting the control channels according to the predefined information, the control information including simplified, resource allocation domain, simplified Modulation and Coding Scheme (MSC) level, the number of simplified Hybrid Automatic Repeat reQuest (HARQ) processes, the number of repetitions of traffic channels and repeated subframes occupied by the traffic channels; or determining a timing relationship between the control channels and traffic channels using one of following methods after determining the resources for transmitting the control channels according to the predefined information, comprising:

method 1: a starting subframe of repeated traffic channels is the same as that of repeated control channels; and method 2: a starting subframe of the repeated traffic channels is the same as an end subframe of the repeated control channels; and method 3: a starting subframe of the repeated traffic channels and an end subframe of the repeated control channels are separated by r subframes, r≥0.

6. The method according to claim 1, further comprising: determining the number of repetitions of traffic channels after determining the resources for transmitting the control channels according to the predefined information, the number of repetitions of the traffic channels being respectively configured by the communication node according to the traffic channel type or fed back by a terminal corresponding to the communication node.

7. The method according to claim 6, wherein the number of repetitions of the traffic channels is determined by factors, including channel type, coverage level, predefined period, the number of repeated transmissions of a main information block (MIB), Physical Random Access Channel (PRACH) format and downlink control information indication; or the traffic channel type includes:

a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels; or a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels; or a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels; or a kind of traffic channels scheduled by SI-RNTI-scranibled control channels, and a kind of downlink traffic channels scheduled by P-RNTI, RA-RNTI and C-RNTI-scrambled control channels.

8. A method for processing transmission of control channels comprising:

a terminal determining resources for transmitting control channels according to predefined information and detecting repeatedly the control channels multiple times on the determined resources for transmitting the control channels, the predefined information including at least one of following information: the number of repetitions of the control channels, control channel type, traffic channel type and traffic channel starting position;

wherein the determining resources for transmitting the control channels according to predefined information comprises:

the terminal configuring independently a starting subframe of control channels scheduling cell specific information and a starting subframe of control channels scheduling specific information according to the control channel type;

wherein the starting subframe of the control channels is configured using one of following methods:

method 1: the starting subframe of the control channels is determined according to a relation $(k+h*n)\bmod N=0$, wherein k represents a serial number of an available downlink subframe in a radio frame in which the starting subframe of the control channels is located, $0 \le k \le h-1$, n represents a frame number of the radio frame in which the starting subframe of the control channels is located, h is the number of available downlink subframnes contained in one radio frame, and N represents the number of repetitions of the control channels;

method 2: the starting subframe of the control channels is determined according to a relation $(k+h*n)\bmod M=m$, wherein k represents a serial number of an available downlink subframe in a radio frame in which the starting subframe of the control channels is located, $0 \le k \le h-1$, n represents a frame number of the radio frame in which the starting subframe of the control channels is located, h is the number of available downlink subframes contained in one radio frame, M is a period, N represents the number of repetitions of the control channels, $N \le M$, and m is a subset of a set $\{0, N, 2*N, \ldots, (M/N-1)*N\}$;

method 3: the starting subframe of the control channels is determined according to a relation $k=(Y+h*n1-N+1)$ or $k=(Y+h*n1-N)$ and n mod M=m, wherein k represents a serial number of an available downlink subframe in a radio frame in which the starting subframe of the control channels is located, Y represents a frame number of starting subframe of traffic channels, n1 represents a frame number of a radio frame in which the starting subframe of the traffic channels is located, n represents a frame number of the radio frame in which the starting subframe of the control channels is located, h is the number of available downlink subframes contained in one radio frame, M is a period, N represents the number of repetitions of the control channels, N≤M*h, m=0, or m is a subset of a set {0, 1, 2, . . . , M/h }; and method 4: the starting subframe of the control channels is determined according to a relation (k+h*n)mod N=m, wherein k represents a serial number of an available downlink subframe, in a radio frame in which the starting subframe, of the control channels is located, 0≤k≤h−1, n represents a frame number of the radio frame in which the starting subframe of the control channels is located, h is the number of available downlink subframes contained in one radio frame, N represents the number of repetitions of the control channels, and m is a subset of a set {0, 1, . . . , N−1}.

9. The method according to claim 8, wherein the resources for transmitting the control channels are at least located in two or more than two subframes or in one subframe where the number of Orthogonal Frequency Division Multiplexing (OFDM) symbols occupied by, the control channels is greater than 3; or the number of repetitions of the control channels is determined by factors, including one or more of coverage level, preamble of random access, random access response message, conflict resolution message, aggregation level, control information DCI format, control information type, system information and physical broadcast channel (PBCH) information, and the PBCH information includes the number of repetitions of the PBCH and/or signaling carried by the PBCH, and the control information type includes cell specific information and UE, specific information.

10. The method according to claim 8, wherein the terminal receives one or more of the number N of repetitions of the control channels, the period M and m by a newly added bit domain of a broadcast channel before detecting the control channels, to determine the resources for transmitting the control channels; or the determining resources for transmitting control channels according to predefined information further comprises determining positions of subframes of the control channels using one of following methods after determining the starting subframe of the control channels, comprising:
method 1: N subframes transmitted repeatedly N times are occupied successively in a successive occupancy manner; and
method 2: N subframes transmitted repeatedly N times are occupied in a T uniformly-spaced subframe occupancy manner.

11. The method according to claim 8, wherein after determining the resources for transmitting the control channels, the method further comprises:
the terminal determining aggregation levels and search spaces of the control channels according to the number of repetitions of the control channels, the aggregation levels and the search spaces of the control channels are the same as corresponding aggregation levels and search spaces in each of subframes occupied by the control channels, and the same candidate of the same aggregation level is selected by the terminal in the search space of each of the subframes occupied by the control channels; or in a specific search space of a terminal corresponding to a communication node, a starting position of a control channel element (CCE) in each of subframes is same, $Y_k$, is 16 or $Y_k=(A \cdot n_{RNTI})$mod D, where $Y_k$ represents a starting position of a specific search space in a subframe with subframe number being k, A represents a constant 39827, $n_{RNTI}$ represents a value of Radio Network Temporary Identity (RNTI), and D represents a constant 65537; or in a specific search space of a terminal corresponding to a communication node, a starting position of a CCE in each of the subframes is different according to a frame number of a radio frame and/or the number of repetitions.

12. The method according to claim 8, wherein control information carried by the control channels includes simplified resource allocation domain, simplified Modulation and Coding, Scheme (MSC) level, the number of simplified Hybrid Automatic Repeat reQuest (HARQ) processes, the number of repetitions of traffic channels and repeated subframes occupied by the traffic channels; or further comprising determining a timing relationship between the control channels and traffic channels using one of following methods after determining the resources for transmitting the control channels according to the predefined information, comprising:
method 1: a starting subframe of repeated traffic channels is the same as that of repeated control channels: and
method 2: a starting subframe of the repeated traffic channels is the same as an end subframe of the repeated control channels; and
method 3: a starting subframe of the repeated traffic channels and end subframes of the repeated control channels are separated by r subframes, r≥0.

13. The method according to claim 8, further comprising: determining the number of repetitions of traffic channels after determining the resources for transmitting the control channels according to the predefined information, the number of repetitions of the traffic channels being respectively configured by the terminal according to the traffic channel type, wherein the number of repetitions of the traffic channels is determined by factors, including channel type, coverage level, predefined period, the number of repeated transmissions of a main information block (MIB), Physical Random Access Channel (PRACH) format and downlink control information indication; or determining the number of repetitions of traffic channels after determining the resources for transmitting the control channels according to the predefined information, the number of repetitions of the traffic channels being respectively configured by the terminal according to the traffic channel type, wherein the traffic channel type includes;

a kind of traffic channels scheduled by system information (SI)-RNTI, paging (P)-RNTI and random access (RA)-RNTI-scrambled control channels and a kind of downlink traffic channels scheduled by cell (C)-RNTI-scrambled control channels; or a kind of traffic channels scheduled by SI-RNTI-scrambled control channels, a kind of traffic channels scheduled by P-RNTI and RA-RNTI-scrambled control channels and a kind of downlink traffic channels scheduled by C-RNTI-scrambled control channels; or a kind of traffic channels scheduled by SI-RNTI-scrambled control channels, a kind of traffic channels scheduled by P-RNTI-scrambled control channels, a kind of traffic channels scheduled by RA-RNTI-scrambled control channels and a kind of downlink traffic channels scheduled by C-RNTI-scrambled control channels; or a kind of traffic channels scheduled by SI-RNTI-scrambled control channels, and a kind of downlink traffic channels scheduled by P-RNTI RA-RNTI and C-RNTI-scrambled control channels.

\* \* \* \* \*